United States Patent
Shouji et al.

[11] Patent Number: 5,926,348
[45] Date of Patent: Jul. 20, 1999

[54] MAGNETORESISTIVE HEAD HAVING A MAGNETORESISTIVE ELEMENT WITH BENT PORTIONS LOCATED AT POINTS OF HIGH LONGITUDINAL BIAS MAGNETIC FIELD INTENSITY

[75] Inventors: Shigeru Shouji; Atsushi Toyoda, both of Hamamatsu, Japan

[73] Assignee: Yamaha Corporation, Japan

[21] Appl. No.: 08/919,032

[22] Filed: Aug. 27, 1997

[30] Foreign Application Priority Data

Aug. 28, 1996 [JP] Japan .................................. 8-245691
Oct. 31, 1996 [JP] Japan .................................. 8-305661

[51] Int. Cl.$^6$ ........................................................ G11B 5/39
[52] U.S. Cl. ............................................................ 360/113
[58] Field of Search ........................................ 360/113, 110, 360/126; 324/252; 338/32 R

[56] References Cited

U.S. PATENT DOCUMENTS

| | | | |
|---|---|---|---|
| 5,018,037 | 5/1991 | Krounbi et al. | 360/113 |
| 5,079,035 | 1/1992 | Krounbi et al. | 427/130 |
| 5,140,484 | 8/1992 | Maruyama | 360/113 |
| 5,296,987 | 3/1994 | Anthony et al. | 360/113 |
| 5,434,826 | 7/1995 | Ravipati et al. | 367/140 |
| 5,436,777 | 7/1995 | Soeya et al. | 360/113 |
| 5,438,470 | 8/1995 | Ravipati et al. | 360/113 |
| 5,508,866 | 4/1996 | Gill et al. | 360/113 |
| 5,554,265 | 9/1996 | Bonyhard et al. | |
| 5,668,686 | 9/1997 | Shouji et al. | 360/113 |
| 5,818,685 | 10/1998 | Thayamballi | 360/113 |
| 5,828,532 | 10/1998 | Ahlert et al. | 360/113 |

FOREIGN PATENT DOCUMENTS

| | | |
|---|---|---|
| 5-135332 | 6/1993 | Japan . |
| 8-185612 | 7/1996 | Japan . |
| 8-185613 | 7/1996 | Japan . |

OTHER PUBLICATIONS

S.H. Liao, et al., "Stability and Biasing Characteristics of A Permanent Magnet Biased SAL/MR Device", IEEE Transactions on Magnetics, vol. 30, No. 6, Nov. 1994.

Primary Examiner—Brian E. Miller
Attorney, Agent, or Firm—Ostrolenk, Faber, Gerb & Soffen, LLP

[57] ABSTRACT

A magneto-resistance type magnetic head having: a base; a longitudinal bias portion, formed over the base and having a first upper flat surface and a first slanted portion, for generating a longitudinal bias magnetic field; a lead portion laminated directly on the longitudinal bias portion so as to cover the first upper flat portion and to expose the first slanted portion of the longitudinal bias portion, wherein the lead portion is made of non-magnetic material and has a second upper flat surface and a second slanted portion, and wherein the first and second slanted portions collectively serve as a slanted surface; and a magneto-resistance material layer formed over the longitudinal bias portion and the lead portion, wherein the magneto-resistance material layer directly contacts an upper surface of the base and magnetically couples with the exposed longitudinal bias portion through the slanted surface of the longitudinal bias portion, wherein the magneto-resistance material layer is terminated on the slanted surface.

11 Claims, 24 Drawing Sheets

MAGNETORESISTIVE HEAD HAVING A MAGNETORESISTIVE ELEMENT WITH BENT PORTIONS LOCATED AT POINTS OF HIGH LONGITUDINAL BIAS MAGNETIC FIELD INTENSITY

This application is based on Japanese Patent Applications No. 8-245691 filed on Aug. 28, 1996 and No. 8-305661 filed on Oct. 31, 1996, the entire contents of which are incorporated herein by reference.

BACKGROUND OF THE INVENTION a) Field of the Invention

The present invention relates to a magnetoresistive effect type thin film magneto-electric transducer (hereinafter called "MR type magnetic head element") which is used as a reproduction head element for magnetic recording media such as hard disks.

b) Description of the Related Art

An MR type magnetic head element is dedicated to reproduction only which reproduces information recorded on a magnetic recording medium by detecting a magnetic field from magnetic poles in the medium with a magnetoresistive type MR head element. As compared to induction type magnetic head elements, MR effect type magnetic head elements can improve track density and linear recording density. A reproducing MR type magnetic head element is used in combination with a recording induction type magnetic head element to constitute an induction-MR type composite magnetic head for magnetic disks such as hard disks.

A magnetic sensor film (MR element) of a conventional MR type magnetic head element has generally a of straight line shape as viewed from the pole top face. An MR type magnetic head element, the magnetic sensor film of which has a trapezoidal shape as viewed from the pole top face, has been proposed in JP-A 8-185612 and JP-A 8-185613 assigned to the present applicant. FIG. 2 shows the main structure of such an MR type magnetic head element 28. The pole top face TF is directed toward recording media. A lead 16 is formed on an unrepresented lower gap layer, the lead 16 being a lamination of a magnetic film 10, an electrically conductive film 12, and a magnetic film 14. A trapezoidal groove 18 is formed in this lead 16 which is divided into right and left portions 16a and 16b. A magnetic sensor film 26 is disposed over the right and left leads 16b and 16a and groove 18, the sensor film 26 being a lamination of an MR film 20, a spacer 22 and a soft adjacent layer (SAL) bias film 24. An active region 26a of this trapezoidal magnetic sensor film 26 is defined between the inner lower sharp edges of the right and left leads 16b and 16a (at the bottom area of the groove 18). This active region 26a detects signals recorded on each track of a magnetic recording medium (magnetic disk). The width TH1 of the active region 26a corresponds to a track width. However, slanted regions 26b and 26c of the magnetic sensor film 26, formed on slanted surfaces of the trapezoidal groove 18 at the right and left sides of the active region 26a, have lower reproduction sensitivities because these regions have azimuth angles relative to signals recorded on each track. Therefore, even if a track shifts right or left from the active region 26a, the slanted regions 26b and 26c affect less the magnetization of the active regions 26a, improving the symmetry of off-track characteristics relative to the center of the track and also reducing side lobes. The side lobe is a small bump which is generated in the off-track characteristics asymmetrically with respect to the center. Since the off-track characteristics becomes approximately symmetrical with respect to the center, a tracking servo to locate the magnetic head over a desired track even if it is narrow and high density recording and reproduction become possible. Furthermore, crosstalk between adjacent tracks can be reduced. Still further, since side lobes can be reduced without increasing uniaxial anisotropic bias magnetic fields, reproduction sensitivity can be prevented from being lowered.

The trapezoidal magnetic sensor film 20 of such an MR type magnetic head element 28 is bent at transition regions 30 from the bottom to slanted surfaces of the trapezoidal shape. Therefore, these transition regions 30 of the MR film 20 are likely to become multi-axial because of the magnetic anisotropy effects, and Barkhausen noises are easy to generate because of a change in magnetic domains. This phenomenon becomes more conspicuous the larger the aspect ratio of the length of the magnetic sensor film 26 in the depth direction (element height TH2) to the track width TH1 and the smaller the gap thickness between the upper and lower shield layers (not shown) sandwiching the magnetic sensor film 26.

SUMMARY OF THE INVENTION

An object of the present invention is to reduce Barkhausen noises of an MR type magnetic head element having a trapezoidal magnetic sensor film.

Another object of the present invention is to provide an MR type magnetic head element capable of stabilizing the intensity of signals reproduced in an off-track state and reducing noise levels of reproduced signals.

According to one aspect of the present invention, there is provided a magneto-resistance type magnetic head having: a base; a longitudinal bias portion, formed over the base and having a first upper flat surface and a first slanted portion, for generating a longitudinal bias magnetic field; a lead portion laminated directly on the longitudinal bias portion so as to cover the first upper flat portion and to expose the first slanted portion of the longitudinal bias portion, wherein the lead portion is made of non-magnetic material and has a second upper flat surface and a second slanted portion, and wherein the first and second slanted portions collectively serve as a slanted surface; and a magneto-resistance material layer formed over the longitudinal bias portion and the lead portion, wherein the magneto-resistance material layer directly contacts an upper surface of the base and magnetically couples with the exposed longitudinal bias portion through the slanted surface of the longitudinal bias portion, wherein the magneto-resistance material layer is terminated on the slanted surface.

It is possible to prevent multi-axes of a magnetic sensor film and generation of Barkhausen noises, and to reproduce stabilized signals.

DETAILED DESCRIPTION OF THE PREFERRED EMBODIMENTS

Figure 1:
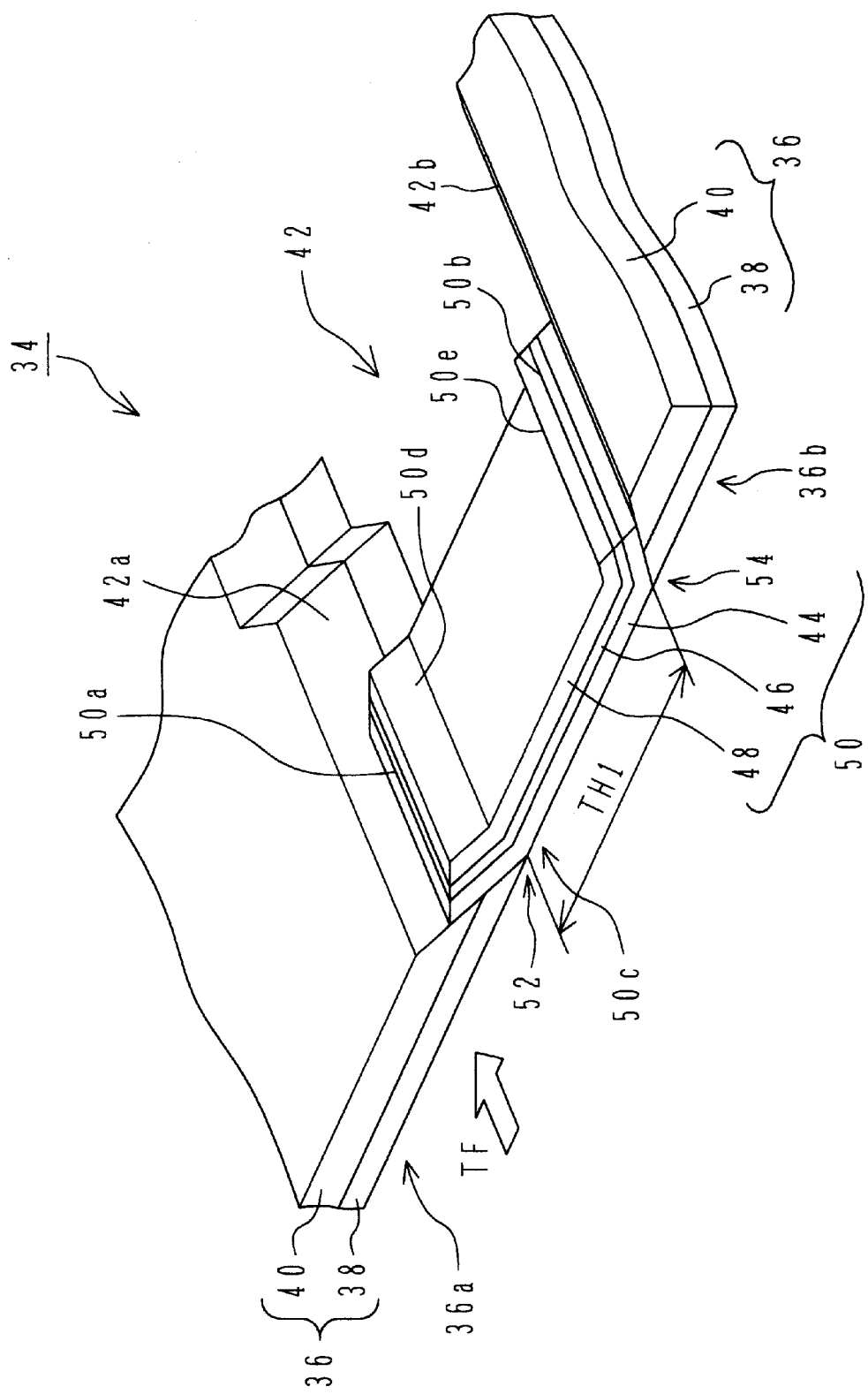
FIG. 1 is a perspective view of an MR type magnetic head element according to an embodiment of the invention.
Figure 3A:
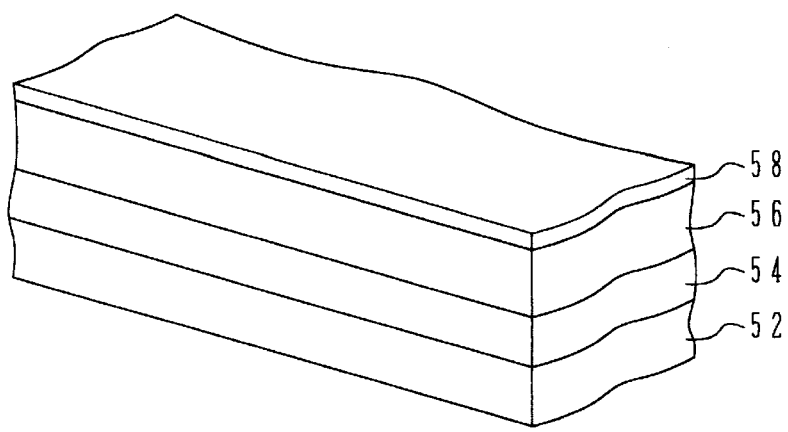
FIGS. 3A to 3K are perspective views illustrating an example of manufacture processes of an induction-MR type composite magnetic head having the MR type magnetic head element shown in FIG. 1.

Embodiments of the invention will be described with reference to the accompanying drawings. FIG. 1 shows the main part structure of an MR type magnetic head element 34. This magnetic head element 34 can reproduce signals recorded on a magnetic recording medium (not shown) facing the pole top face TF (the face confronting the recording medium) of the head element. In this specification, a width direction is a direction generally parallel to the recording medium confronting the top face TF of the head element 34 and also generally parallel to the surface of a substrate 52 (FIG. 3A), and a height direction is a direction generally parallel to the recording medium confronting top face TF of the head element 34 and also generally perpendicular to the surface of the substrate 52 (FIG. 3A).

In FIG. 1, an upper shield layer, an upper gap layer and others are omitted in order to make the structure of the MR type magnetic head element 34 easy to understand. The magnetic head element 34 has a lead 36 formed on the lower gap layer (not shown). The lead 36 is made of a multilayer of a magnetic film 38 and an electrically conductive layer 40 stacked upon the magnetic film 38. The magnetic film 38 is a hard bias (longitudinal bias) magnetic film made of CoCrPt or the like, and the electrically conductive film 40 is made of material having good electrical conductivity such as W, Ta and Nb. The magnetic film 38 is magnetized in the longitudinal direction (track width TH1 direction). The lead 36 is divided by trapezoidal an inverse-trapezoidal groove 42.

A magnetic sensor film 50 is made of a lamination of an MR film 44, a spacer (MSL: magnetic spacer layer) 46 and an SAL bias film (transverse bias film) 48. The MR film 44 is made of NiFe or the like, the spacer 46 is made of Ti or the like, and the SAL bias film 48 is made of soft magnetic material. The magnetic sensor film 50 interconnects the right and left lead portions 36b and 36a. The magnetic sensor film 50 is configured such that its right and left end portions 50b and 50a terminate at intermediate positions of right and left slanted surfaces 42b and 42a of the groove 42. The magnetic sensor film 50 is therefore electrically coupled to the leads 36b and 36a at the slanted surfaces 42b and 42a, respectively. An active region 50c of the magnetic sensor film 50 is defined between the inner lower sharp edges of the right and left leads 36b and 36a (at the bottom area of the groove 42). This active region 50c detects signals recorded on each track of a magnetic recording medium. Right and left regions of the active region 50c of the magnetic sensor film 50 form slanted regions 50e and 50d.

A conduction state between the lead 36 and magnetic sensor film 50 can be established even if the opposite ends 50b and 50a of the magnetic sensor film 50 terminate at any positions on the slanted surfaces 42b and 42a. However, ideally, it is desired that the opposite ends 50a and 50b terminate near the border between the electrically conductive film 40 and magnetic film 38. In practice, some margin is provided so that as shown in FIG. 1 the opposite ends 50a and 50b terminate at positions slightly beyond the border toward the electrically conductive film 40 side.

In the MR type magnetic head element 34 constructed as above, current flows from the lead 36a (or 36b) to the magnetic sensor film 50 via the junction between the lead 36a and magnetic sensor film 50, and to the lead 36b (or 36a) via the junction between the lead 36b and magnetic sensor film 50.

A longitudinal bias magnetic field is applied to the magnetic sensor film 50 from the magnetic film 38 so that uniaxial anisotropy of the MR film 44 is made strong and multi-axes are prevented. The MR film 44 and magnetic film 38 abut against each other only at the slanted surface of the magnetic film 38 for magnetic coupling therebetween. The magnetic film 38 disposed under the electrically conductive film 40 is generally at the same height as the magnetic sensor film 50. Therefore, a distance, between the tips (inner lower edges) of the magnetic film 38 at the opposite ends of the track width TH1 and bent portions 52 and 54 (at the upper surface of the magnetic sensor film 50) where the MR film 44 provide magnetic anisotropy effects, can be made very short (0.1 μm or less). A magnetic field sufficiently strong for cancelling out a demagnetizing field of the MR film 44 which imparts magnetic anisotropy can therefore be applied to the bent portions 52 and 54, thereby preventing multi-axes of the MR film 44 and suppressing generation of Barkhausen noises.

Figure 2:
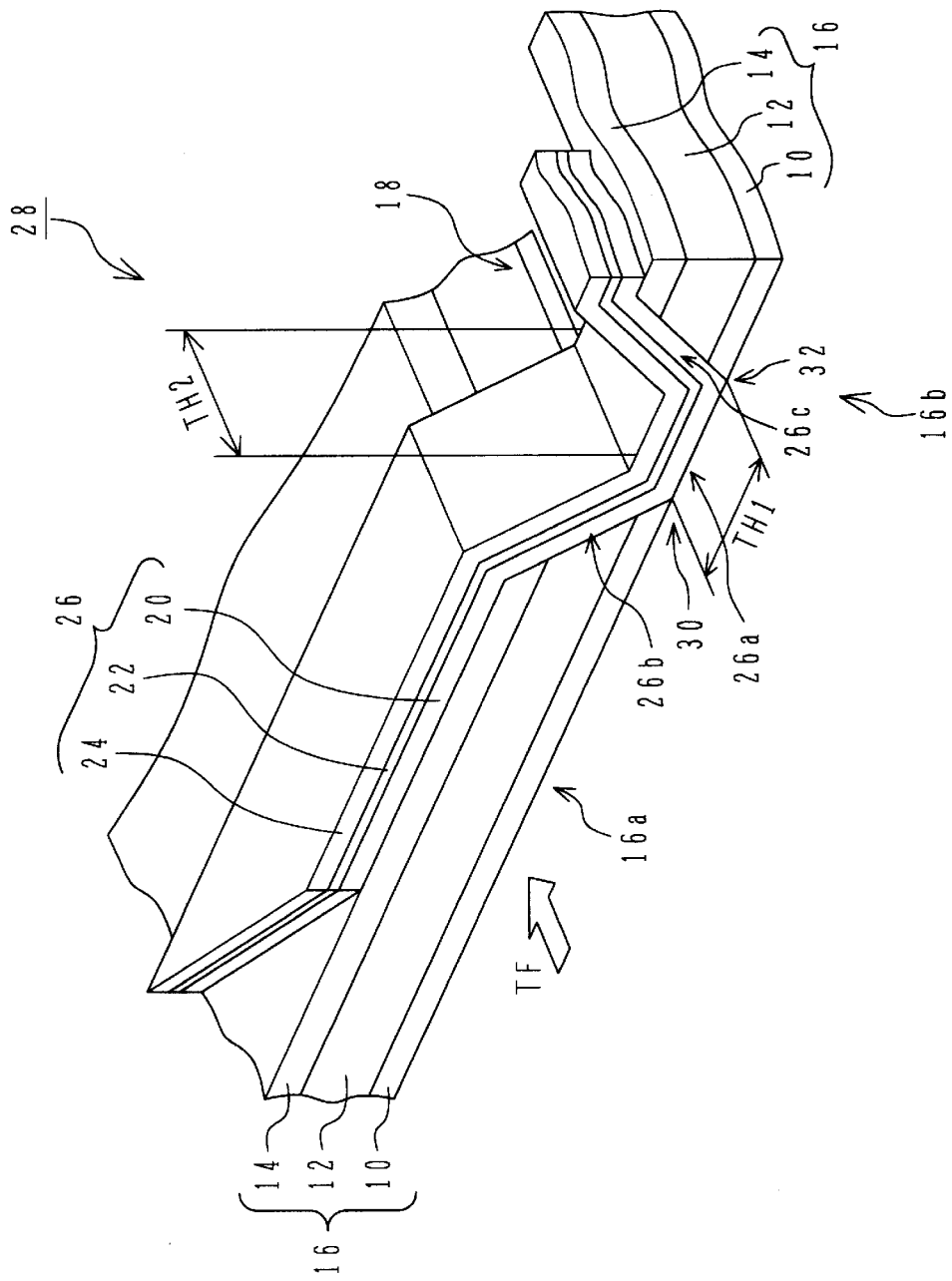
FIG. 2 is a perspective view of an MR type magnetic head element formed by conventional techniques.

If the lateral length of the magnetic sensor film 50 is large and reaches to the upper surfaces of the lead portions 36a and 36b (in the case of the structure of a conventional MR type magnetic head element shown in FIG. 2), the magnetic sensor film 50 and magnetic film 38 magnetically couple in a broad area and the magnetic field at the bent portions 52 and 54 of the magnetic sensor film 50 weakens. (The magnetic-moment is only developed by magnetic film 38 but the magnetic flux is present on both magnetic sensor film 50 and magnetic film 38 which are laminated and exchange-coupled, thereby magnetic flux density, the hard magnet moment square times thickness of hard magnetic film 38 divided by the sum of each magnetic film moment times the thickness of each magnetic films, is reduced. If both the film moment and the film thickness are near even, the magnetic flux density is reduced to half, and the magnetic field at the bent portion is down to nearly half.)

In contrast, in the structure shown in FIG. 1, the right and left ends 50b and 50a of the magnetic sensor film 50 terminate at the intermediate positions of the slanted surfaces 42b and 42a and the magnetic couple is established only at these slanted surface areas. It is therefore possible to form a bias magnetic field which has a high intensity (as much as possible generated by the hard magnetic film 38) but which also weakens steeply away from the bent portion (at magnetic sensing area).

As the result, the intensity of the magnetic field generated by the magnetic film 38 increases at the bent portions 52 and 54 where the magnetic anisotropy imparting demagnetizing field of the MR film 44 is strong, thereby further preventing multi-axes of the MR film 44 and effectively suppressing generation of Barkhausen noises.

If the magnetic sensor film 50 extends to the upper surfaces of the lead portions 36a and 36b, as in the conventional case, the magnetic sensor film 50 spreads on the hard magnet film. This disturbs the magnetic domain of the sensing part of the magnetic film 50, because the magnetic sensor film 50 extended to the upper surface of the lead portions 36a and 36b has not made a contribution to change a resistance by the external field but instead, results in the magnetic spin being rotated by the magnetic field and transmitted to the adjacent area. Therefore unless the magnetic sensor film 50 on the bias magnetic film 38 is removed the magnetic fluctuation from an adjoining area is transmitted to the sensing area and is super impose on the signal originally played back from the track at the sensing area.

The bias magnetic field in bent portions of this type magnetic sensor is essentially weak and the anisotropy which keeps domain stability of the magnetic sensor is low. Accordingly, the signal from the magnetic sensor when it moves from one track to a neighbor track may degrade the tracking profile of signal intensity. In contrast, in the case of the structure shown in FIG. 1, magnetic sensor film 50 is short and the area not forming the active region 50c is very small. Therefore, the above-described disadvantages do not occur and the tracking profile can be maintained good.

The manufacture processes of an induction-MR type composite magnetic head having the MR type magnetic head 34 shown in FIG. 1 will be described with reference to the cross sectional views shown in FIGS. 3A to 3K.

(1) Referring to FIG. 3A, a substrate 52 in the form of a wafer is made of ceramic material such as $Al_2O_3$-TiC or the like, and is later lapped to form a slider of magnetic heads. On an insulating film ($Al_2O_3$ or the like) 54 formed on the substrate 52, a lower shield layer 56 and a lower gap layer 58 are sequentially deposited. The lower shield layer 56 is made of a soft magnetic film such as NiFe and FeAlSi deposited through sputtering, vapor deposition, or plating.

The lower gap layer 58 is made of insulating material such as $Al_2O_3$ deposited to a thickness of 50 to 300 nm.

Figure 3B:
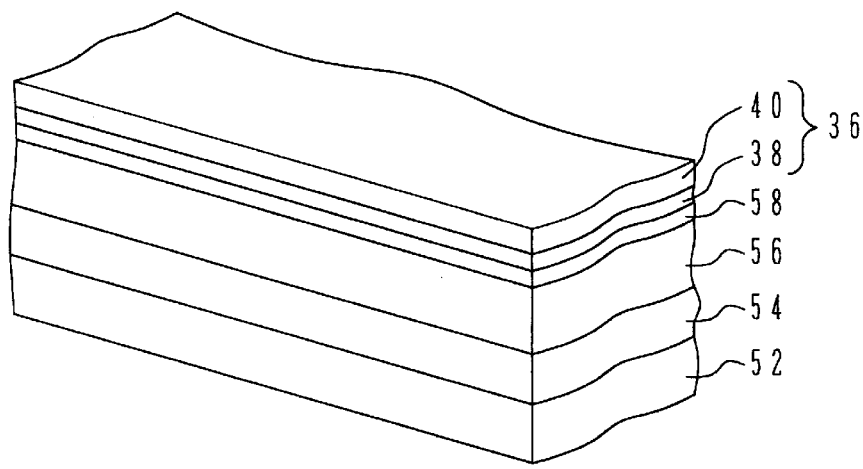

(2) Referring to FIG. 3B, on the lower gap layer 58, a hard magnetic film 38 of CoCrTa, CoCrPt, CoPt or the like and an electrically conductive and non-magnetic film 40 of W, Ta, Nb or the like are laminated through sputtering, vapor deposition, or plating. For example, the hard magnetic film 36 is made of CoCrPt deposited to a thickness of 50 to 200 nm, and the electrically conductive and non-magnetic film 40 is made of Ta deposited to a thickness of 100 to 300 nm. The hard magnetic film 38 and electrically conductive and non-magnetic film 40 constitute a lead 36.

Since the hard magnetic film 38 is formed over the planar substrate 52, it can take the crystal orientation [1 1 1]. If the hard magnetic film 38 is formed by sputtering, the crystal orientation is not disturbed because this deposition process is executed in an atmosphere not containing resist components and moisture. Once crystals of a stable orientation [1 1 1] are formed, this stable orientation is not disturbed even if the hard magnetic film 38 is later exposed to moisture.

Figure 3C:
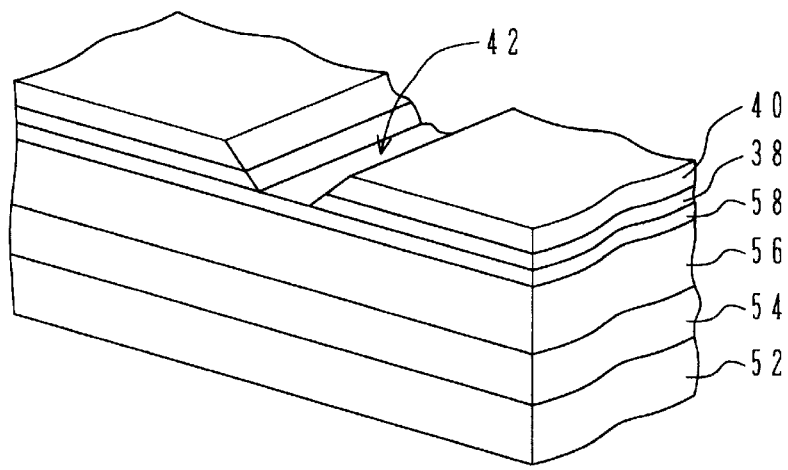
Figure 4A:
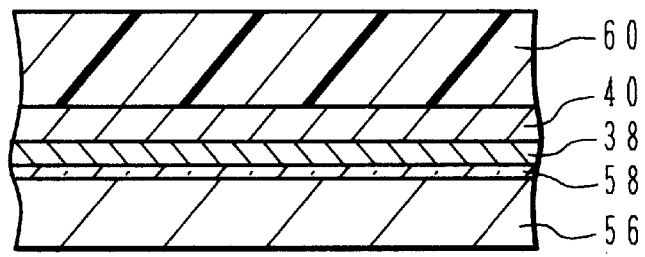
FIGS. 4A to 4F are cross sectional views detailing the process shown in FIG. 3C.
Figure 4B:
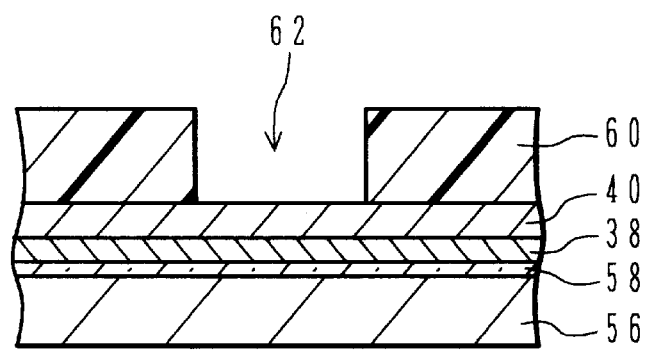
Figure 4C:
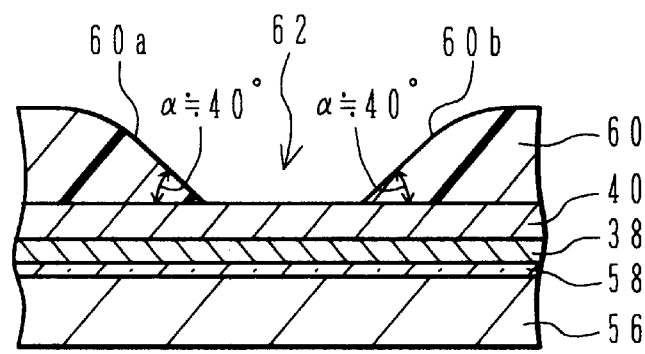
Figure 4D:
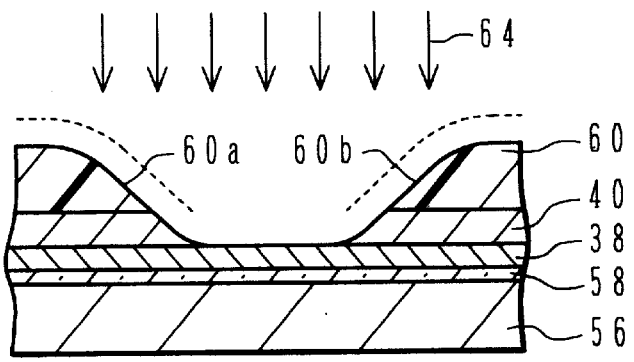
Figure 4E:
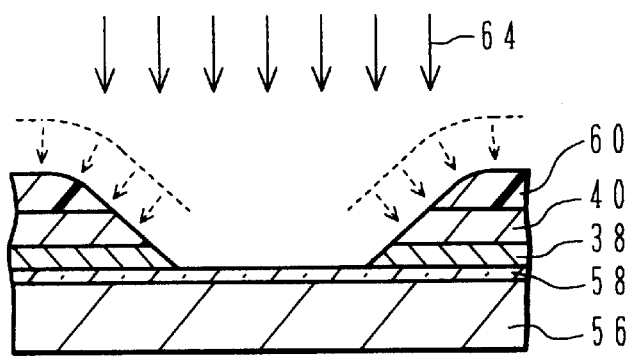
Figure 4F:
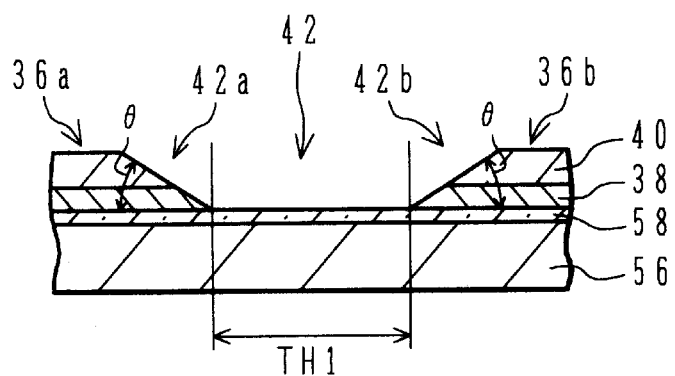

(3) Referring to FIG. 3C, both the magnetic film 38 and electrically conductive film 40 are etched at the same time to form an inverse-trapezoidal groove 42. This process is illustrated in more detail in FIGS. 4A to 4F. (I) Referring to FIG. 4A, a resist film 60 is formed over the whole surface of the electrically conductive film 40. For example, novolak positive resist such as AZ400K is spin coated about 2 $\mu$m thick (which is about three times the total thickness of the magnetic film 38 and electrically conductive film 40). The resist film 60 may be formed thinner to improve etching precision and manufacture yield, because it is coated on a flat surface of a lamination of the conductive film 40 and hard magnetic film 38. (II) Referring to FIG. 4B, the resist film 60 is exposed and developed to form a groove 62 of a predetermined size having vertical side walls. (III) Referring to FIG. 4C, the wafer (substrate) is placed on a hot plate for 30 minutes at a temperature of 200° C. to reflow (melt) the resist film 60 and form walls 60a and 60b of the groove 62 slanted by about 40°. (IV) Referring to FIG. 4D, ion beams 64 of argon or the like are bombarded to the wafer in the vertical direction to execute plasma etching (ion milling). With this etching, the surface of the resist film 60 is etched and the slanted walls retract laterally. As these slanted walls 60a and 60b retract laterally, the electrically conductive film 40 is trenched in an inverse-trapezoidal shape. (V) Referring to FIG. 4E, the ion beams 64 also trench the magnetic film 38 in an inverse-trapezoidal shape. When this trenching reaches the bottom of the magnetic film 38 (when the upper surface of the lower gap layer 58 is exposed), the ion milling is stopped. The ion beams 64 may be applied at a small oblique angle relative to the vertical direction to prevent roughness of the milling surface. (VI) As shown in FIG. 4F, as the resist film 60 is removed, leads 36a and 36b having an inverse-trapezoidal groove 42 are completed. The slant angle θ of each of the slanted surfaces 42a and 42b of the finished leads 36a and 36b is given by the following equation.

θ=$tan^{-1}$ [(milling speed of materials 38 and 40 of the lead 36/milling speed of resist 60) tan α] where α is an initial slant angle (refer to FIG. 4C) of the slanted surfaces 60a and 60b of the resist film 60 and is about 20° if the magnetic film 38 is made of CoCrPt and the electrically conductive film 40 is made of Ta. The track width TH1 (distance between lower sharp edges of the leads 36a and 36b) can be regulated by the initial thickness of the lead materials 38 and 40, the initial slant angle α of the resist film 60, and the initial width of the groove 62.

Figure 3D:
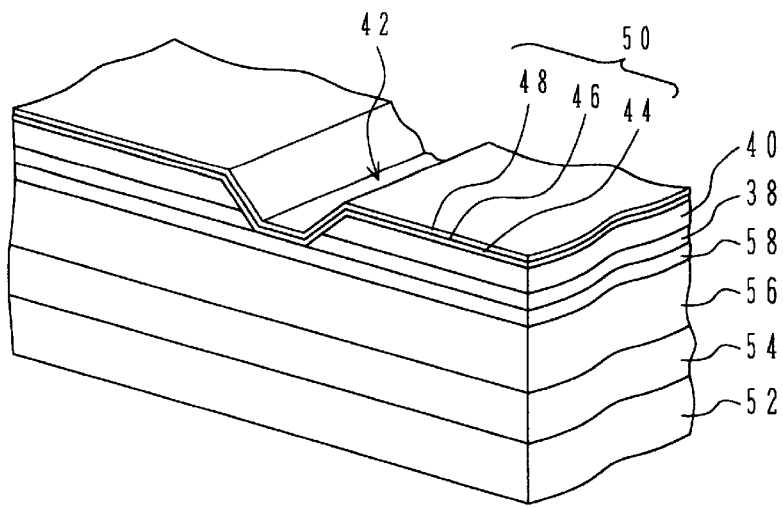

(4) As shown in FIG. 3D, after the trapezoidal groove 42 is formed, a magnetic sensor film 50 is formed over the whole surface of the wafer. The magnetic sensor film 50 is a lamination of an MR film (NiFe or the like) 44, a spacer (Ti or the like) 46, and an SAL bias film (soft magnetic material such as CoZrM (M is Nb, Mo or the like), NiFeRh, and NiFeZr) 48.

Figure 3E:
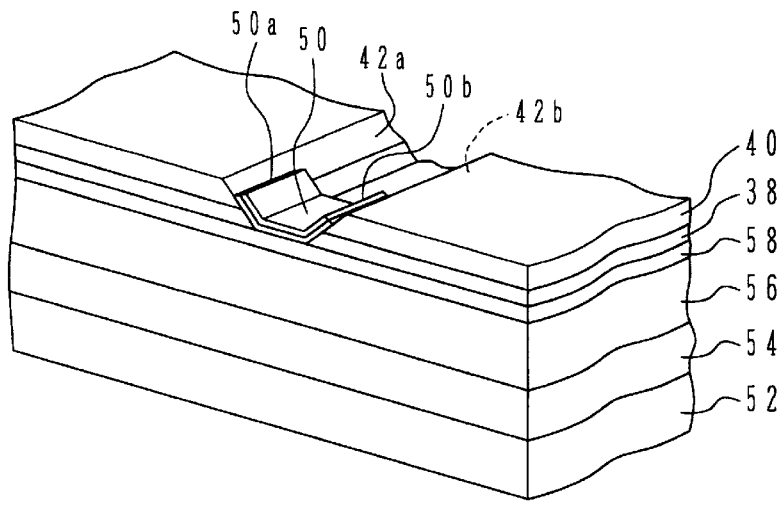

(5) A resist film having a pattern of an objective magnetic sensor film is formed on the magnetic sensor film 50 and an unnecessary portion of this film 50 is etched by milling to thereby form a rectangular magnetic sensor film 50 such as shown in FIG. 3E. In this state, right and left ends 50b and 50a of the magnetic sensor film 50 terminate at the intermediate positions of the slanted surfaces 42b and 42a.

Figure 3F:
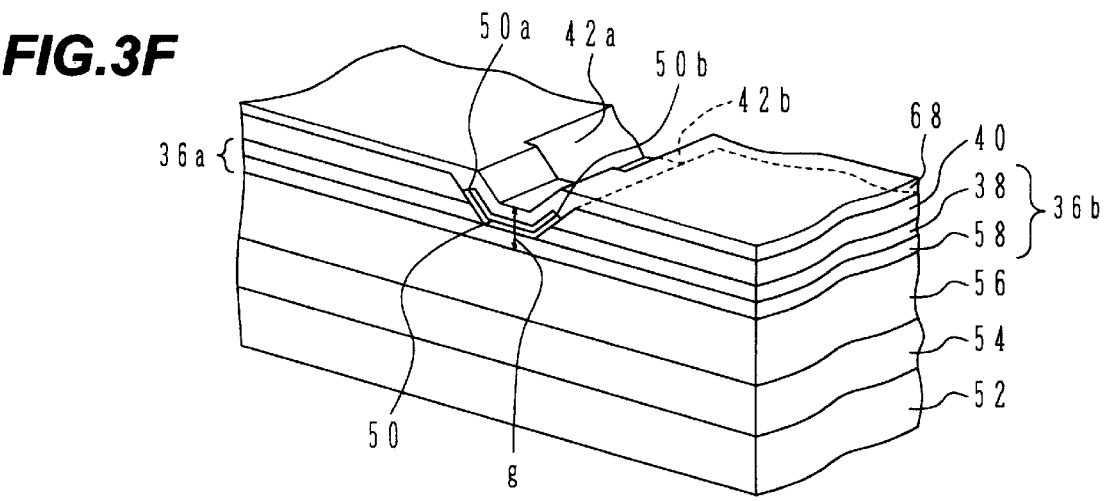

(6) Referring to FIG. 3F, an inorganic insulating film of $Al_2O_3$ or the like is deposited over the whole surface of the wafer to form an upper gap layer 68. The upper gap layer 68 insulates the magnetic sensor film 50 from an upper shield layer and forms a shield gap between the upper shield layer and the leads 36a and 36b. If the right and left ends 50b and 50a of the magnetic sensor film 50 extend to the upper surfaces of the leads 36b and 36a (as in the case of the conventional structure shown in FIG. 2), it is necessary to form the upper gap layer 68 thin in order to fill the steps at the right and left ends 50b and 50a. However, in this embodiment, since the right and left ends 50b and 50a terminate at the slanted surfaces 42b and 42a, it is possible to form the upper gap layer 68 with a minimum necessary thickness and to shorten the effective gap length g. The effective gap length g corresponds to a total thickness of the lower gap layer 58, magnetic sensor film 50 and upper gap layer 68.

Figure 3G:
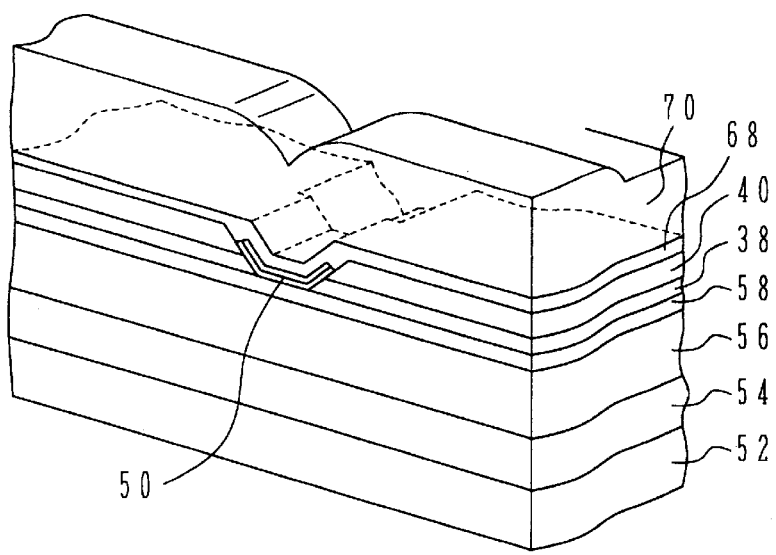

(7) As shown in FIG. 3G, a soft magnetic film (NiFe, FeAlSi or the like) is deposited through plating, vapor deposition, sputtering or the like to form an upper shield layer 70 on the upper gap layer 68. The upper shield layer 70 serves also as a lower core layer of the write head (induction type magnetic head element).

Figure 3H:
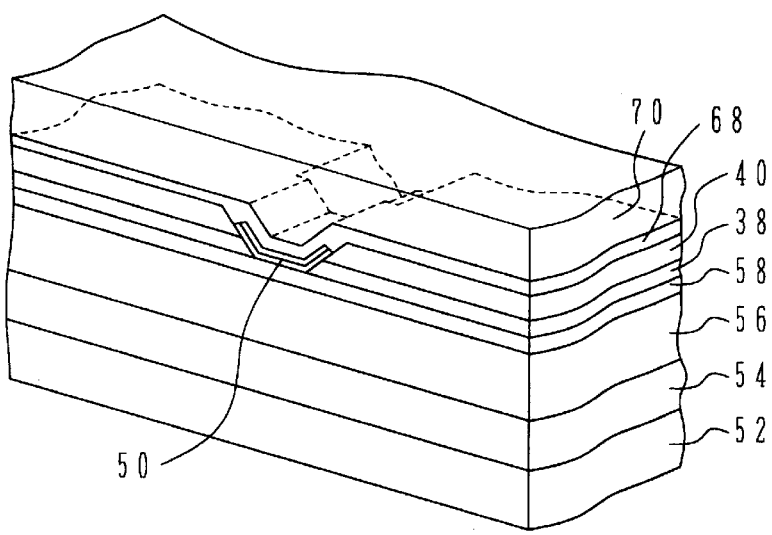

(8) As shown in FIG. 3H, the surface of the upper shield/lower core layer 70 is mechanically abraded by lapping or the like to planarize the surface of this layer 70.

Figure 3I:
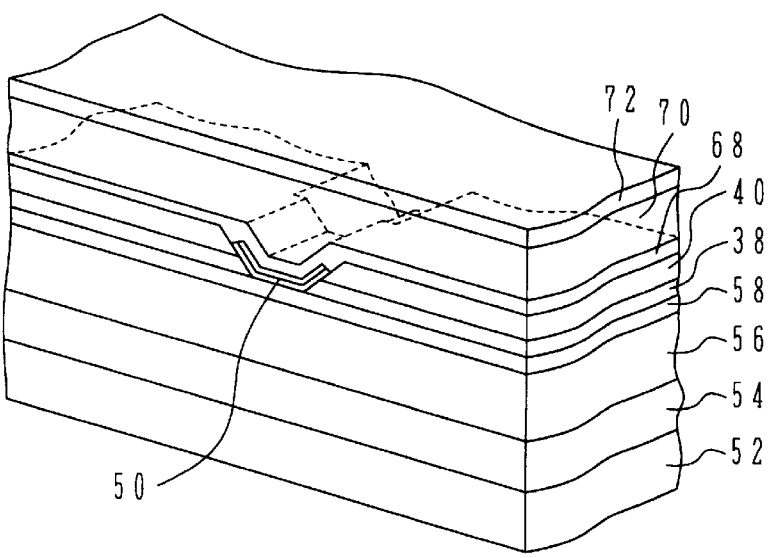

(9) As shown in FIG. 3I, a write gap layer 72 ($Al_2 O_3$ the like) is formed on the upper shield/lower core layer 70.

Figure 3J:
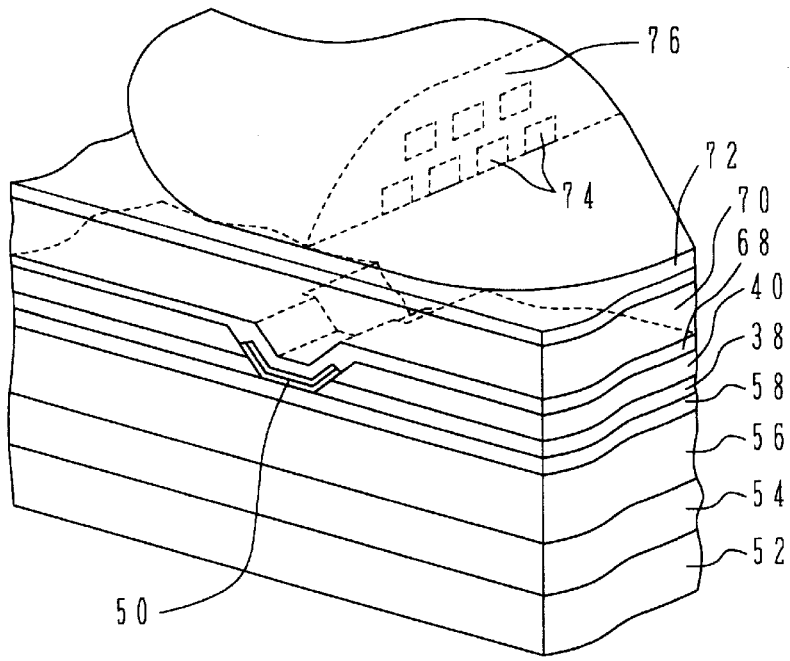

(10) As shown in FIG. 3J, a coil 74 and an insulating layer 76 covering the coil 74 are formed on the write gap layer 72.

Figure 3K:
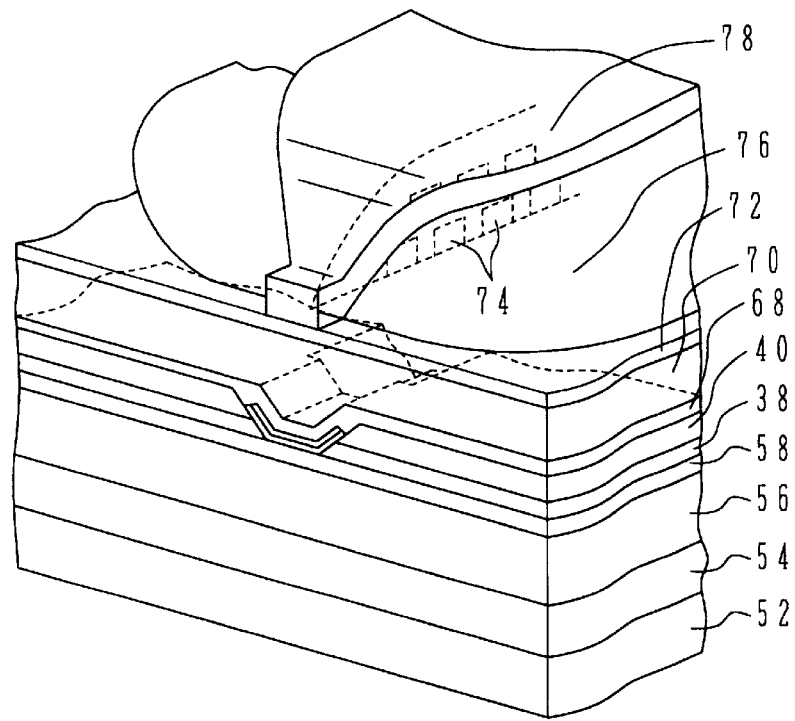

(11) As shown in FIG. 3K, an upper core layer 78 is formed riding upon the coil 74 and insulating layer 76 to form a write head (induction type magnetic head element). Lastly, a passivation film is coated over the wafer.

In this embodiment, right and left ends of the magnetic sensor film are terminated at intermediate positions of the lead right and left slanted surfaces defining the trapezoidal groove. Since the longitudinal magnetic field intensity can be increased at the bent portions of the magnetic sensor film where the magnetic anisotropy effects are produced, Barkhausen noises can be suppressed.

The lead is structured such that a permanent bias magnetic film for forming single magnetic domains is used as a lower layer on which an electrically conductive film is formed as an upper layer. Therefore, the distances between the edges of the permanent bias magnetic film for forming single magnetic domains and the bent portions of the magnetic sensor film can be shortened and the longitudinal magnetic field intensity can be increased at the bent portions of the magnetic sensor film to further suppress Barkhausen noises. The magnetic-moment is only developed origined by the magnetic film but the magnetic flux is present on both the magnetic sensor film and the magnetic film which are laminated and exchange-coupled. Thereby magnetic flux density is reduced. If the magnetic sensor film is thin, the magnetic film should be thin for the same magnetic-moment. Accordingly the single magnetic domain forming permanent bias magnetic film can be made relatively thin and the saturated magnetizing force relatively small can be used. Therefore, influence of the longitudinal bias magnetic field upon the active region (sensing region) of the magnetic sensor film can be reduced, so that sensitivity can be prevented from being lowered by a large longitudinal bias magnetic field otherwise applied to the active region. In this manner, Barkhausen noises can be suppressed by applying a high longitudinal bias magnetic field to the bent portions of the magnetic sensor film, while the influence of a large longitudinal bias magnetic field upon the active region of the magnetic sensor film is suppressed.

Figure 5:
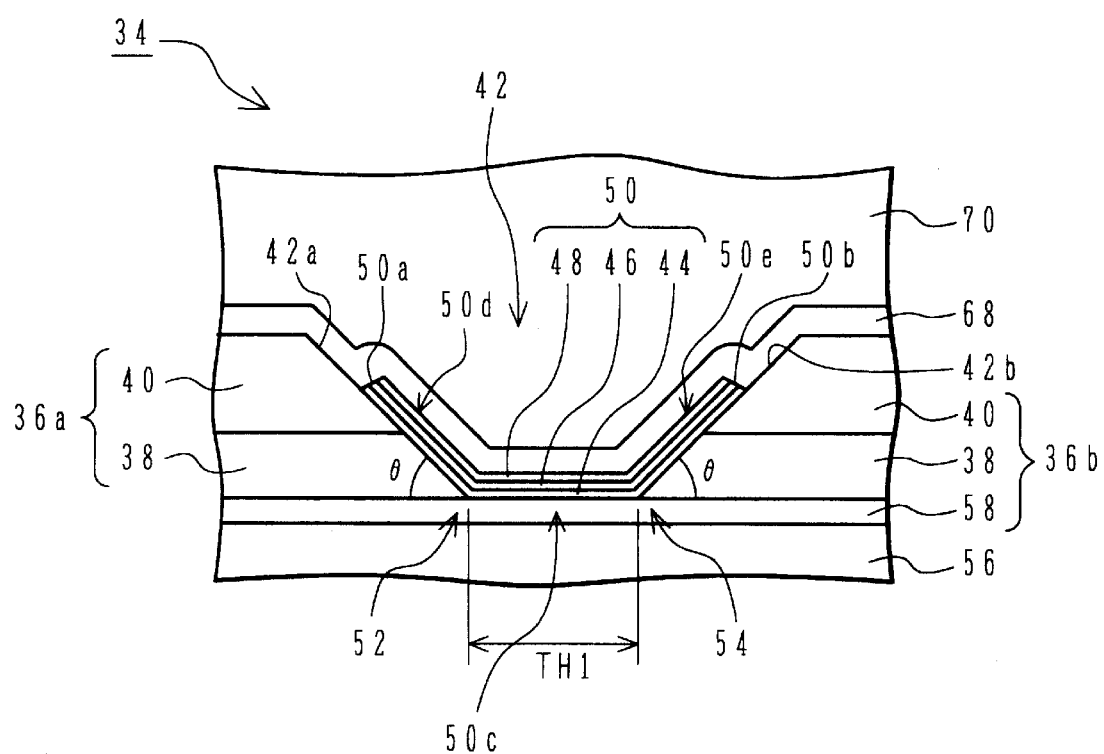
FIG. 5 is a diagram showing an MR type magnetic head element as viewed from the magnetic recording medium side.

FIG. 5 is a schematic diagram showing the pole top face TF of an MR type magnetic head element. The angle θ of the slanted surfaces 42a and 42b of the leads 36a and 36b of this MR type magnetic head element 34 is preferably set in a range from 10° to and 40° inclusive relative to the substrate surface.

Figure 6:
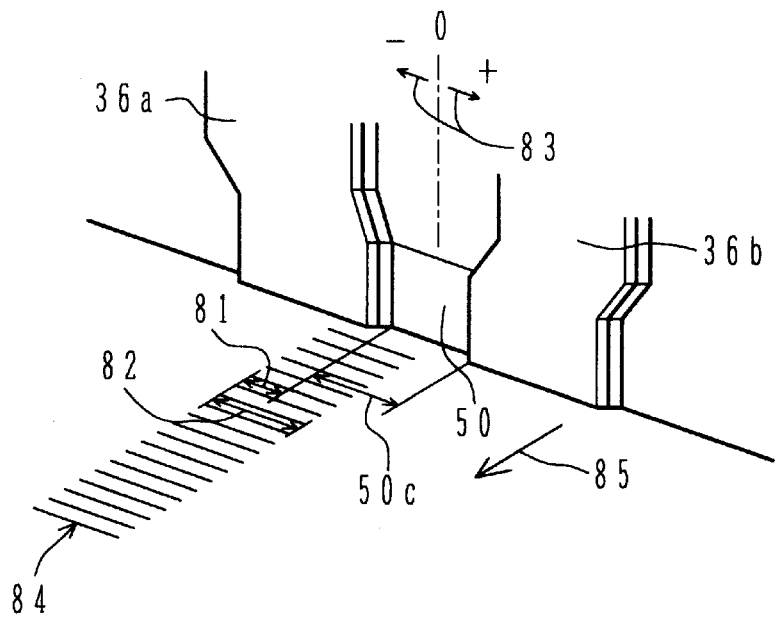
FIG. 6 is a perspective view showing the state that the magnetic head element of FIG. 5 reproduces signals at a half-track offset.

If the angle θ of the slanted surfaces 42a and 42b of the leads is set in the range from 10° to 40°, the intensity of a signal reproduced during an off-track state can be stabilized and the noise level of the reproduced signal can be reduced. The reason for this is given in the following. FIG. 6 shows a magnetic head with the MR type magnetic head element shown in FIG. 5 which reproduces signals in an off-track state in which the active region 50c of the magnetic sensor film 50 is shifted by about a half track relative to the track 82 of a magnetic recording medium (hard disk). An arrow 83 indicates an off-track direction, and an arrow 85 indicates a relative motion direction of the magnetic head and track 82. A pattern 84 on the track 82 is a magnetization inversion pattern recorded on the magnetic recording medium. The intensity of a signal reproduced in an off-track state usually lowers as the off-track amount 61 increases.

Figure 7:
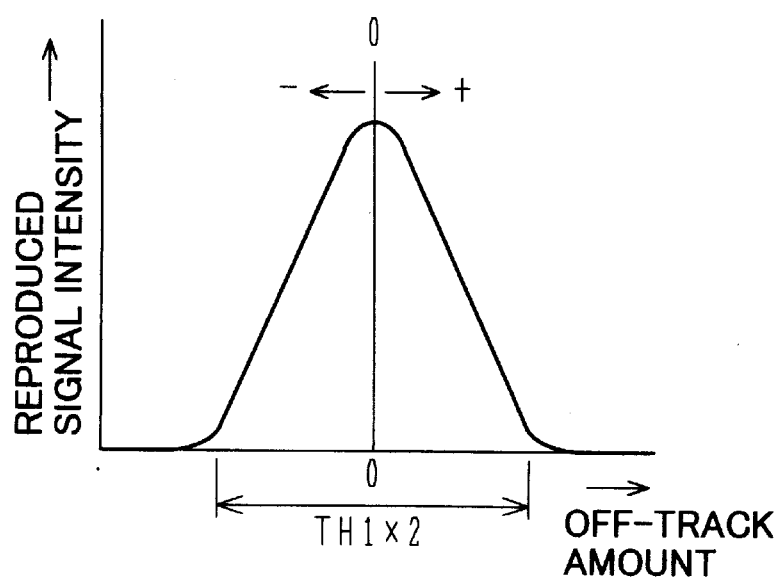
FIG. 7 is a graph showing the normal off-track characteristics of a magnetic head.

FIG. 7 is a graph showing the normal off-track characteristics of a magnetic head. The abscissa represents an off-track amount and the ordinate represents a reproduced signal intensity. A reproduced signal can be obtained if the off-track amount is smaller than twice the track width TH1. The reproduced signal intensity lowers in precise proportion to the off-track amount. The normal off-track characteristics can realize a good tracking servo. Furthermore, since the normal off-track characteristics show repeatability (the same characteristics can be obtained at each measurement), the noise level of a signal reproduced in an off-track state does not increase.

Figure 8A:
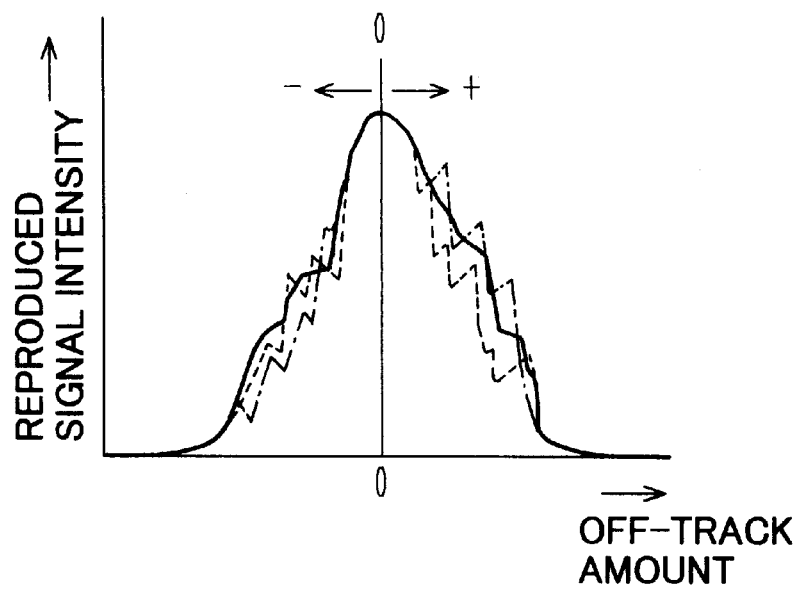
FIGS. 8A and 8B are graphs showing the degraded off-track characteristics of a magnetic head.
Figure 8B:
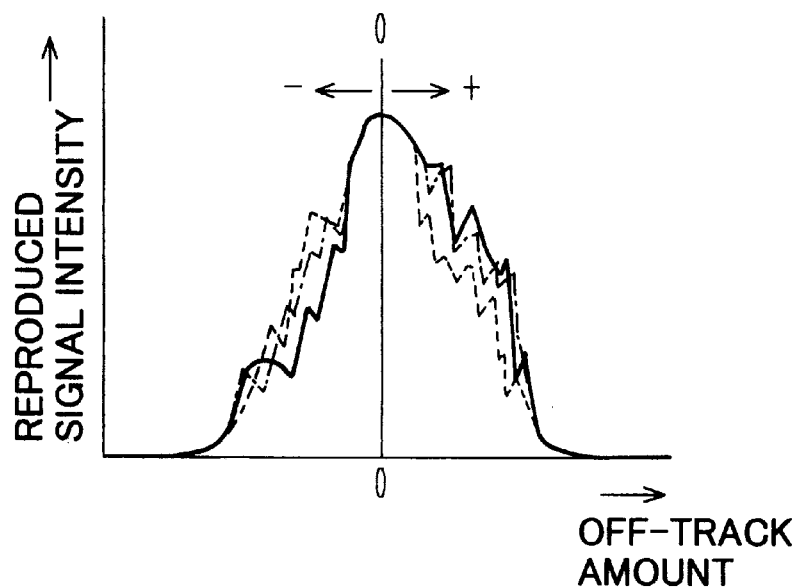

In contrast with the above, FIGS. 8A and 8B show degraded off-track characteristics which are often seen in magnetic heads of the same type that the right and left ends 50b and 50a of the magnetic sensor film 50 shown in FIG. 5 are terminated at the intermediate positions of the slanted surfaces 42b and 42a of the lead. The characteristics shown in FIGS. 8A and 8B were measured by using different magnetic heads. In each of FIGS. 8A and 8B, a solid line, a broken line, and a one-dot-chain line show the reproduced signal intensities of the same magnetic head. The characteristic curves have notches and the off-track amount is not in proportion to the reproduced signal intensity. Therefore, stable synchronization of tracking service is impossible and the magnetic disk drive does not operate normally. The notches on the characteristic curves vary with each measurement even when the same magnetic head is used, and the repeatability of the characteristics is not ensured. Therefore, the reproduced signal output in an off-track state always fluctuates and is unstable so that the noise level of the reproduced signal increases.

Figure 9:
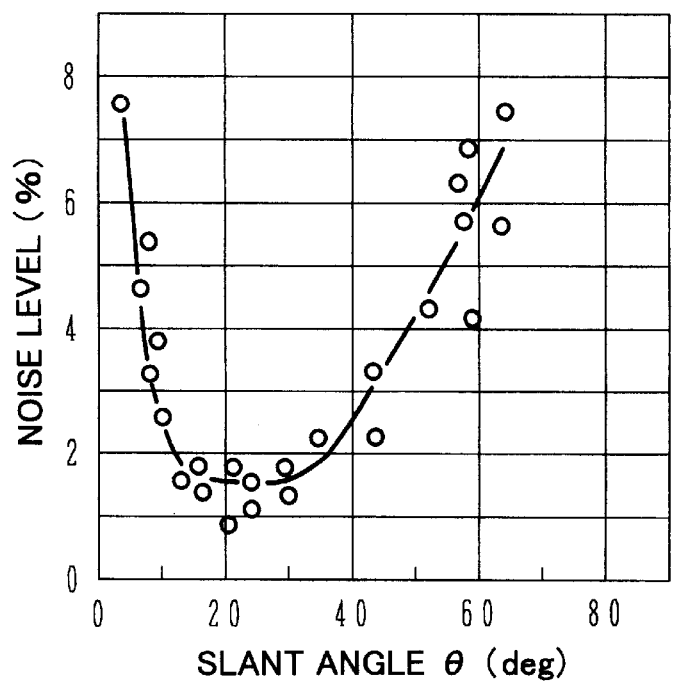
FIG. 9 is a graph showing measurement results of a relationship between a lead slant angle and a noise level during an off-track reproduction by the magnetic head shown in FIG. 5.

FIG. 9 is a graph showing a noise level of a reproduced signal measured at various slant angles θ of the lead slanted surfaces 42a and 42b of the MR type magnetic head shown in FIG. 5. The abscissa represents a slant angle θ and the ordinate represents a noise level. Each noise level is a % value of a fluctuation of signal intensities divided by an average signal intensity, the signal intensities measured 50 times in an off-track state of the magnetic head. The measure conditions are as follows. The hard magnetic film 38 is made of CoCrPt (thickness of 90 nm). The MR film 44 is made of NiFe (thickness of 25 nm). The spacer 46 is made of Ta (thickness of 10 nm). The SAL bias film 48 is made of CoZrNb (thickness of 27 nm). The track width TH1 (distance between the bent portions 52 and 54) is 3.6 μm. The element height TH2 (distance of the magnetic sensor film 50 in the depth direction) is 1.5 μm. The distance overlaping the magnetic sensor film 50 with the lead 36 is 0.7 μm.

As seen from FIG. 9, the noise level increases greatly at the slant angle smaller than 10°. The noise level gradually increases as the slant angle exceeds 40°. At the slant angle of 45° or larger, thermal noises increased gradually, and the resistance of the head during operation and the number of broken heads increased.

Figure 10A:
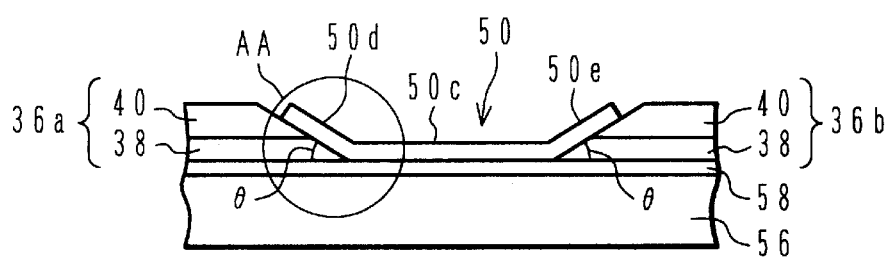
FIGS. 10A to 10C are diagrams illustrating a contracting phenomenon of the magnetic sensor film at its slant transition region when the magnetic head of FIG. 5 has a large lead slant angle.
Figure 10B:
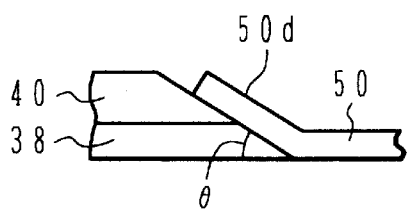
Figure 10C:
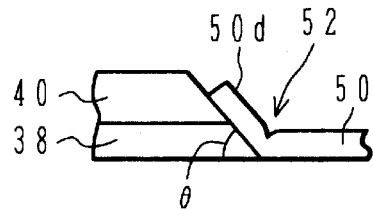

The reason for this will be described with reference to FIGS. 10A to 10C. FIGS. 10B and 10C show enlarged areas AA of the MR type head element shown in FIG. 10A. FIG. 10B shows a small slant angle θ, and FIG. 10C shows a large slant angle θ. As the slant angle θ becomes large, coverage of the magnetic sensor film 50 becomes poor at the bent portion (rising start portion of the slanted surface) and this portion is contracted and locally thinned. Current concentrates on this thinned portion and heat is generated to eventually break the MR type magnetic head. As a result, as the slant angle θ becomes large, the head manufacture yield lowers greatly.

It has been found that a noise level change with the lead slant angle θ results from the following factors.

[A] Factor 1: a noise level change with an longitudinal bias magnetic field intensity at the bent portions 52.

(a) At a small slant angle θ

In slanted regions 50d and 50e of the magnetic sensor film 50, spins move by the magnetic effects in the vertical direction to the main in-plane (a primary plane) direction of the film 50. In order to cancel this anisotropic magnetic energy in the vertical direction and maintain uniaxial anisotropy of the active region 50c, the magnetic film 38 as the lower layer of the lead 36a, 36b is made thin in a wedge like shape at the bent portion 52 and the magnetic field intensity is made weak at the track end (at the bent portion 52). In contrast, since the magnetic sensor film 50 is maintained thick over the whole length thereof, the magnetic field intensity H at the bent portion 52 can be given by the following equation.

$$H = H_{c1} \cdot \{M_{s0} \cdot t_0 / (M_{s0} \cdot t_0 + M_{r1} \cdot t_1)\} \cos \theta$$

where $t_0$ is a total film thickness of the magnetic sensor film 50, $t_1$ is a film thickness of the longitudinal bias magnetic film 38, $M_{r1}$ is a residual magnetization of the longitudinal bias magnetic film 38, $M_{s0}$ is a saturated magnetization of the magnetic sensor film 50, and $H_{c1}$ is a coercive force of the longitudinal bias magnetic film 38.

Figure 11A:
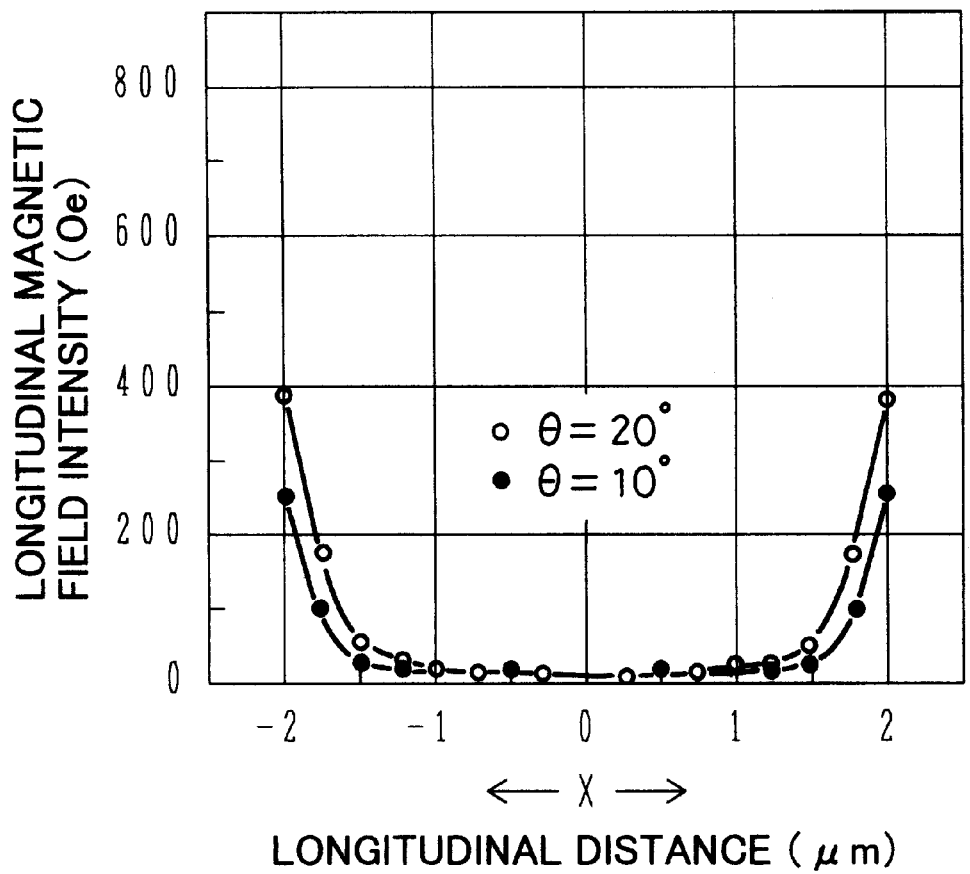
FIGS. 11A and 11B are a graph showing measurement results of a longitudinal magnetic field intensity of the magnetic sensor film at each position in the track width direction when the magnetic head of FIG. 5 has a lead slant angle of 10° or 20° and a schematic cross sectional view showing the structural outline of the magnetic head used for the measurements.
Figure 11B:
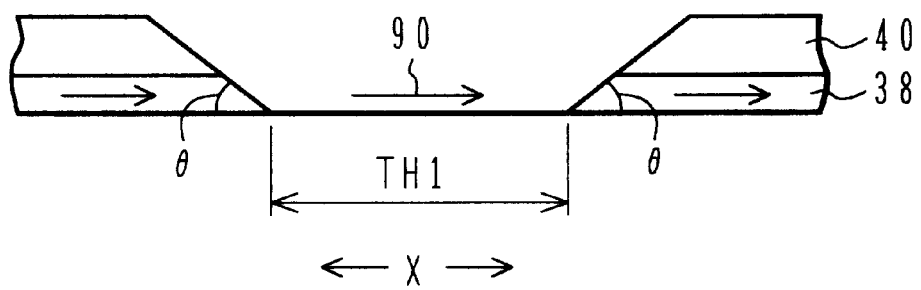

FIG. 11A is a graph showing a magnetic field intensity at each position in the track width (active region width) TH1 of the longitudinal bias magnetic film 38 shown in FIG. 11B, as measured at the slant angles θ of 10° and 20°. The abscissa represents a distance X of the magnetic sensor film 50 from the center thereof in the longitudinal direction (in the track width TH1 direction) and the ordinate represents an intensity of a longitudinal magnetic field 90 (in FIG. 11B). In this example, the track width TH1 is 4 μm and the center position of the track width TH1 is at 0. The magnetic film 38 has $t_1$=90 nm, $H_{c1}$=1000 Oe and $M_{r1}$=7500 gausses. As seen from FIG. 11A, the longitudinal bias magnetic field at the bent portion 52 lowers greatly at a small slant angle θ. Therefore, at a small angle θ the longitudinal bias magnetic field becomes insufficient and Barkhausen noises become likely to generate.

(b) At a large slant angle θ

Figure 12A:
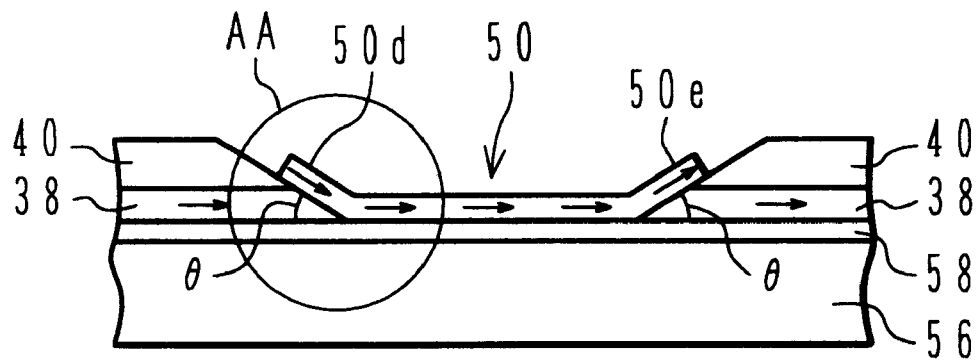
FIGS. 12A and 12B are schematic cross sectional views showing spin orientations of the magnetic head of FIG. 5.
Figure 12B:
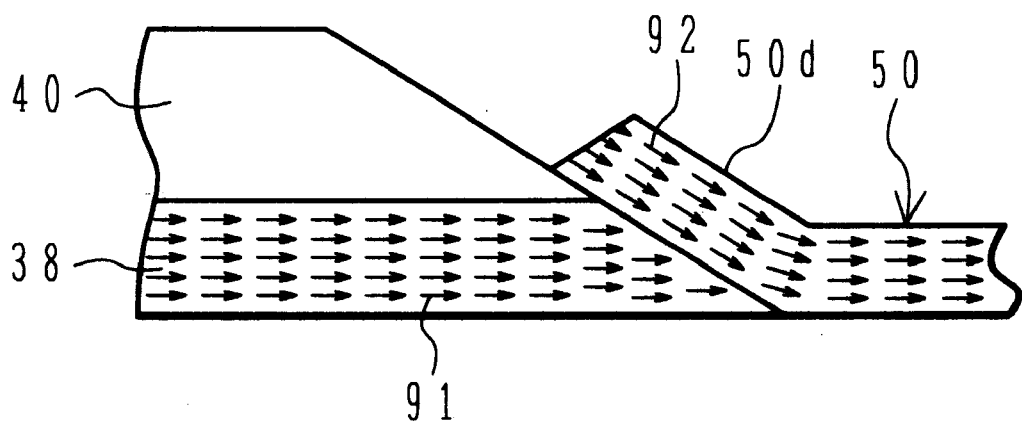

The crystal structure of the magnetic film 38 has an easy axis directed along the film main in-plane direction (a direction along a primary plane of the magnetic film 38). FIG. 12B is an enlarged view of an area AA of an MR type magnetic head element shown in FIG. 12A. As shown in FIG. 12B, an angle between the crystal orientation 91 of the magnetic film 38 and the crystal orientation 92 of the slanted regions 50d and 50e of the magnetic sensor film 50 becomes large at a large slant angle θ. Therefore, magnetic flux between the magnetic film 38 and magnetic sensor film 50 transferred by magnetic spins becomes weak (magnetic coupling becomes weak).

Figure 13:
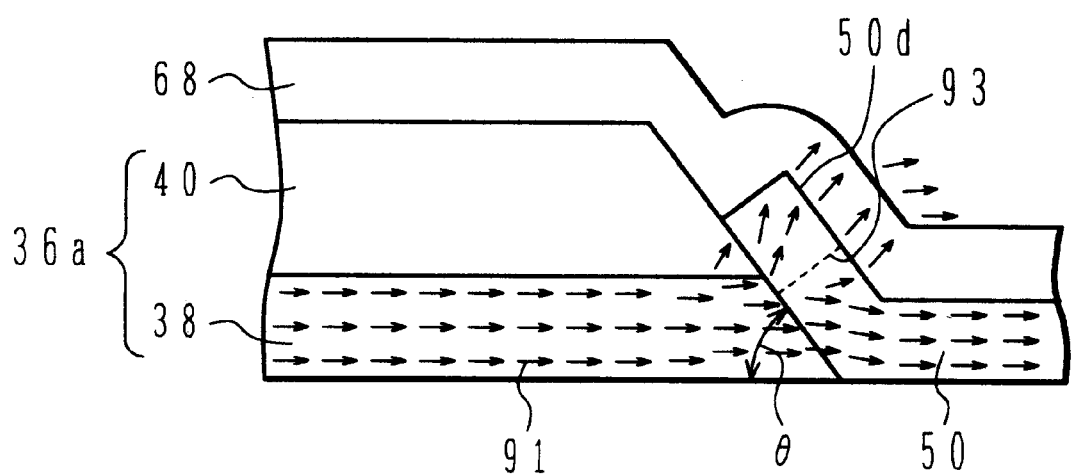
FIG. 13 is a schematic cross sectional view showing spin orientations when the magnetic head of FIG. 5 has a very large slant angle.

At a larger slant angle θ (especially at 45° or larger), the direction of magnetic fluxes passing through the slanted regions 50d and 50e of the magnetic sensor film 50 changes as shown in FIG. 13, and magnetic domains are formed at the changed area to form a domain wall 93. The longitudinal magnetic field in the magnetic sensor film 50 is therefore weakened and Barkhausen noises become more likely to generate.

Figure 14A:
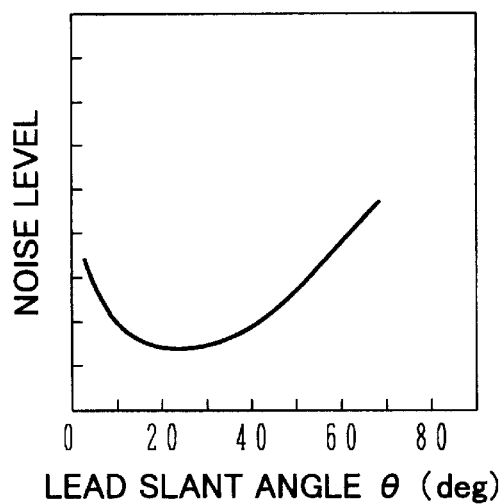
FIGS. 14A to 14C are graphs of the characteristics of dependency of noises upon a lead slant angle when the magnetic head of FIG. 5 is in an off-track state.

As above, the noise level dependent upon the longitudinal bias magnetic field intensity in the bent portion 52 changes with the slant angle θ as shown in FIG. 14A. The noise level lowers in a predetermined range of the slant angle θ.

[B] Factor 2: a noise level change with fluxes from adjacent tracks via the longitudinal bias magnetic film 38.

Figure 14B:
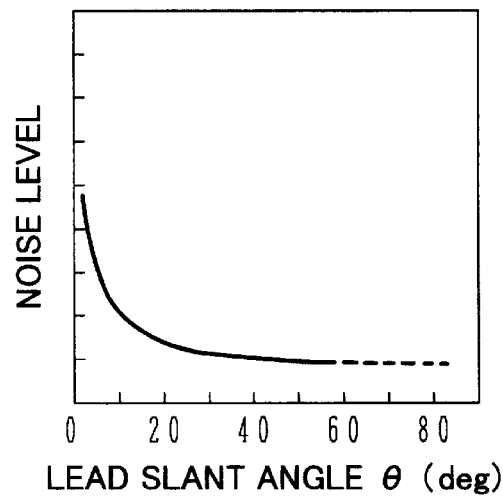

The smaller the slant angle θ, the crystal orientations of the magnetic film 38 and the slanted regions 50d and 50e of the magnetic sensor film 50 become more similar and the contact area between the magnetic film 38 and the magnetic sensor film 50 becomes broader. Therefore, magnetic flux transferred by spin rotation from the magnetic film 38 to the magnetic sensor film 50 transfers well. However, as the slant angle θ becomes smaller, the magnetic sensor film 50 is more affected by the vertical magnetic field applied to the magnetic film 38 from adjacent tracks of a magnetic recording medium, i.e., the magnetic sensor film 50 becomes likely to pick up a magnetic field from adjacent tracks. Therefore, at the smaller slant angle θ a change in the magnetic flux transferred from adjacent tracks via the magnetic film 38 becomes noises on a signal reproduced in an off-track state. As above, the noise level dependent upon magnetic flux transfer from adjacent tracks via the longitudinal bias magnetic film 38 changes with the slant angle θ as shown in FIG. 14B. Noise levels reduce considerably as the slant angle θ lowers than a certain value.

Figure 14C:
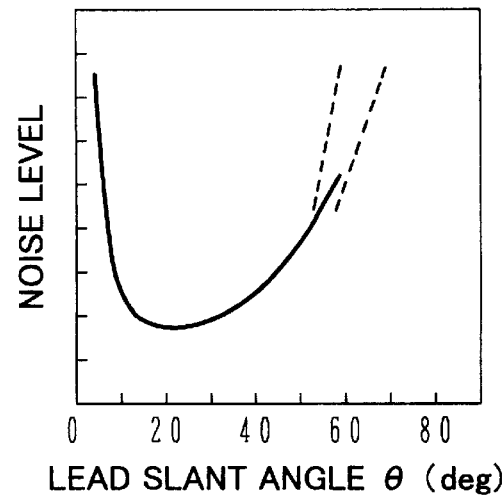

A change in the noise level with the slant angle θ in an off-track state is a combination of the noise level changes (FIGS. 14A and 14B) by the factors 1 and 2, and is illustrated in the graph of FIG. 14C. As shown, in a range of the slant angle θ from 10° to 40° the noise level can be suppressed to a low level. Furthermore, a reproduced signal intensity can be stabilized relative to off-track and a stable tracking servo can be realized. Accordingly, MR type magnetic head elements of high record density and narrow track can be manufactured with high yield.

Figure 15:
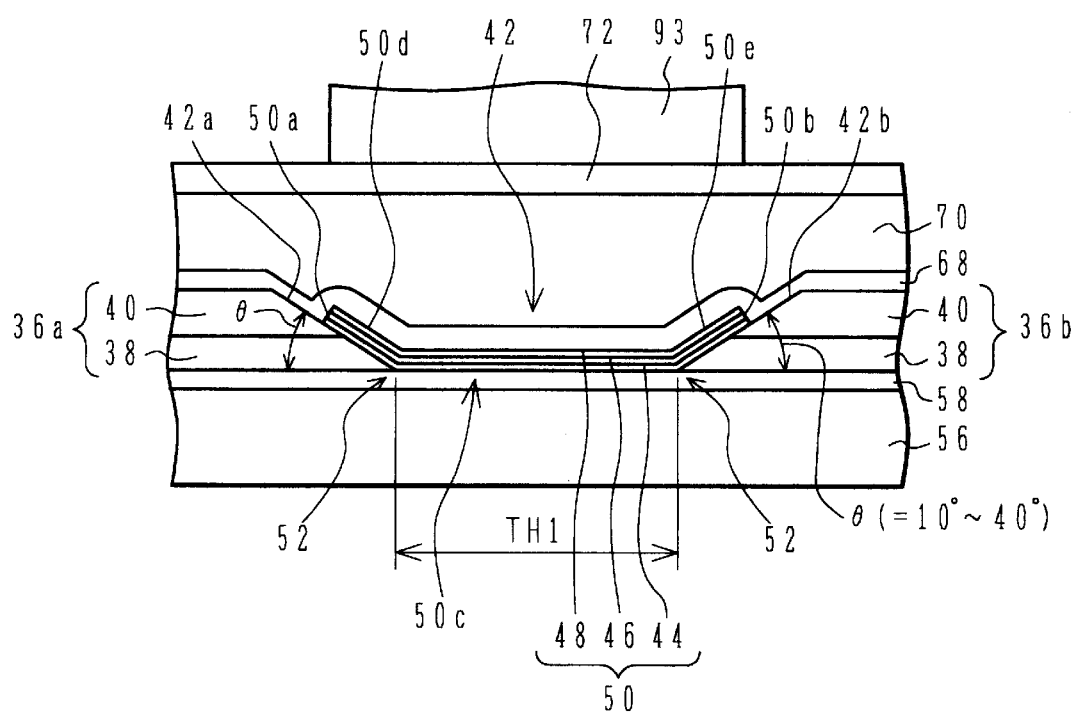
FIG. 15 is a diagram showing a magnetic head as viewed from the magnetic recording medium side.
Figure 16:
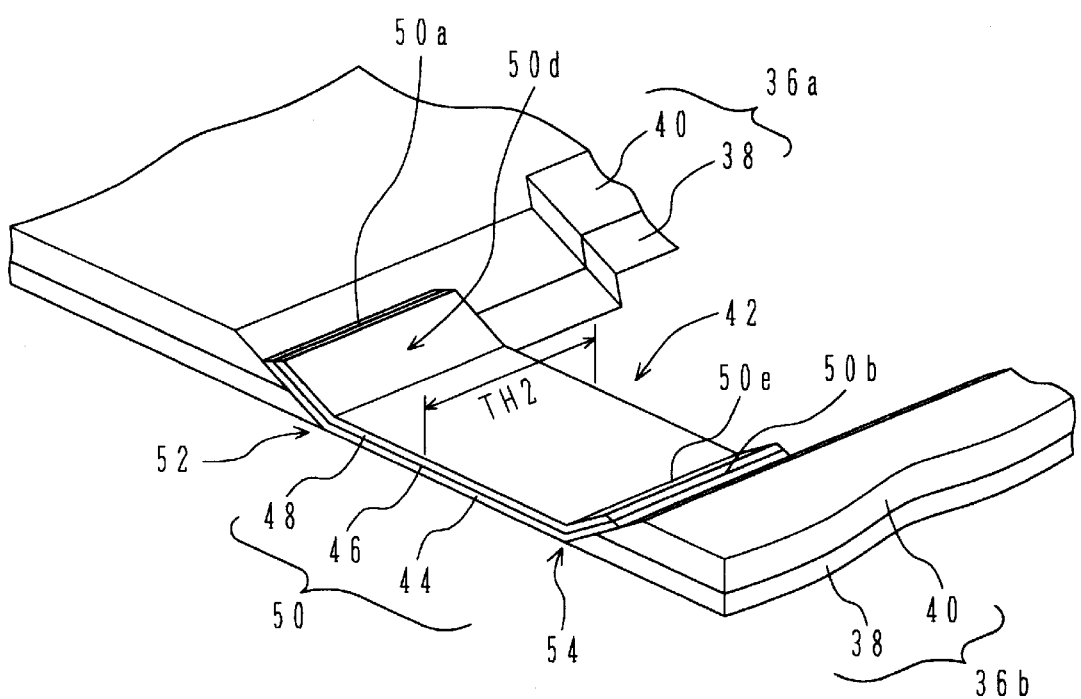
FIG. 16 is a perspective view of the main part of the magnetic head shown in FIG. 15.

FIG. 15 is a cross sectional view of an MR type magnetic head element as viewed from a recording medium side. The main portion of this element is shown in a perspective view of FIG. 16. A lower gap layer 58 is laminated on a lower shield layer 56. On the lower gap layer 58, right and left leads 36b and 36a are disposed with a trapezoidal groove 42 formed therebetween. An angle θ of slanted surfaces 42a and 42b of the leads 36a and 36b is set in a range from 10° to 40° inclusive (the same angle range both on the right and left sides). Each of the leads 36a and 36b is a lamination of a longitudinal bias magnetic film 38 and an electrically conductive layer 40. The rising portions of the slanted surfaces 42a and 42b of the leads 36a and 36b are formed by the magnetic film 38. Although the magnetic film 38 has some conductivity, since the distance to a wire interconnecting area such as pads is long, the electrically conductive layer 40 made of material having low resistance is laminated on the magnetic film 38 to form the leads 36a and 36b of low total resistance.

A magnetic sensor film 50 is formed in the trapezoidal groove 42 on the lower gap layer 58 exposed at the bottom of the groove and on the slanted surfaces 42a and 42b. The magnetic sensor film 50 is a lamination of an MR film 44, a spacer 46 and an SAL bias film 48. The ends 50a and 50b of the magnetic film 50 terminate at intermediate positions of the slanted surfaces 42a and 42b (for example, at positions slightly beyond the border between the magnetic film 38 and electrically conductive film 40 toward the electrically conductive film 40). A portion 50c of the magnetic sensor film 50 between lower edges of the slanted surfaces 42a and 42b constitute an active region which detects signals recorded on a track of a magnetic recording medium. Slanted regions 50d and 50e of the magnetic sensor films 50 are electrically connected to the leads 36a and 36b, respectively. A length TH2 of the magnetic sensor film 50 in the depth direction corresponds to an element height.

An upper gap layer 68 and an upper shield layer 70 are laminated in this order upon the magnetic sensor film 50 and the leads 36a and 36b exposed at the outer areas of the film 50. The upper shield layer 70 serves also as a lower core layer of an induction type thin film recording conversion element. The MR type magnetic head element has the structure described above. On the upper shield/lower core layer 70, a write gap layer 72 and an upper core layer 93 are laminated in this order.

A thickness of the magnetic film 38 is determined, for example, as in the following. A longitudinal bias magnetic field intensity is given as a product of the residual magnetization, coercive force, and thickness of the magnetic film 38. Therefore, the single magnetic domain effects of a longitudinal bias of the magnetic sensor film 50 become greater as the thickness of the magnetic film 38 increases, on the assumption of using the same magnetic material. Although the magnetic film 38 is stable relative to a magnetism change lower than the coercive force, it changes magnetization in the vertical direction (direction generally vertical to a magnetic recording medium) although small in amount, even if a small change in magnetization is applied from the magnetic recording medium. If the magnetic film 38 is magnetically coupled to the magnetic sensor film 50, this magnetization change in the magnetic film 38 excites the magnetic sensor film 50 to generate a fluctuated signal. This fluctuated signal is superposed upon a signal reproduced by the active region 50c. The magnetoresistive effects are so sensitive that even a small signal change generated in the magnetic film 28 disturbs the magnetoresistive effects. Especially, if the magnetic film 38 is thick, the amount of picked-up signal becomes large and off-track noises increase.

Therefore, although a thick magnetic film 38 contributes to imparting uniaxial anisotropy to the magnetic sensor film, off-track noises increase if it is too thick. The off-track characteristics were measured by changing the thickness $t_1$ of the magnetic film 38 having a residual magnetization $M_{r1}$=7500 gausses and a coercive force $H_{c1}$=1000 Oe. The off-track characteristics became stable at $t_1$=90 nm or thicker. At $t_1$=200 nm or thicker, the sensitivity gradually lowered and off-track noises started increasing. In view of this, in a range from 90 nm to 200 nm of t1, the off-track characteristics become stable. The amount of noises in an off-track state is affected by the slant angle θ of the leads 36a and 36b. In a range from 10° to 40° of the slant angle θ, the off-track characteristics became most stable and noises could be minimized.

An example of other manufacture processes of a magnetic head will be described with reference to FIGS. 17A to 17I.

Figure 17A:
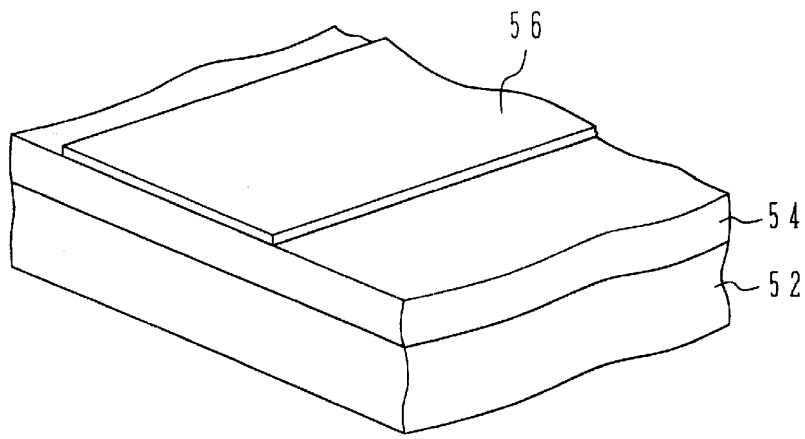
FIGS. 17A to 17I are perspective views illustrating manufacture processes of the magnetic head of FIG. 15.

(1) As shown in FIG. 17A, a substrate 52 in the form of wafer a is made of ceramic material such as $Al_2O_3$-TiC or the like, and is later lapped to form a slider of magnetic heads. On an insulating film ($Al_2O_3$ or the like) 54 formed on the substrate 52, a lower shield layer 56 is formed in a predetermined shape. The lower shield layer 56 is made of a soft magnetic film such as NiFe and FeAlSi deposited through sputtering, vapor deposition, or plating.

Figure 17B:
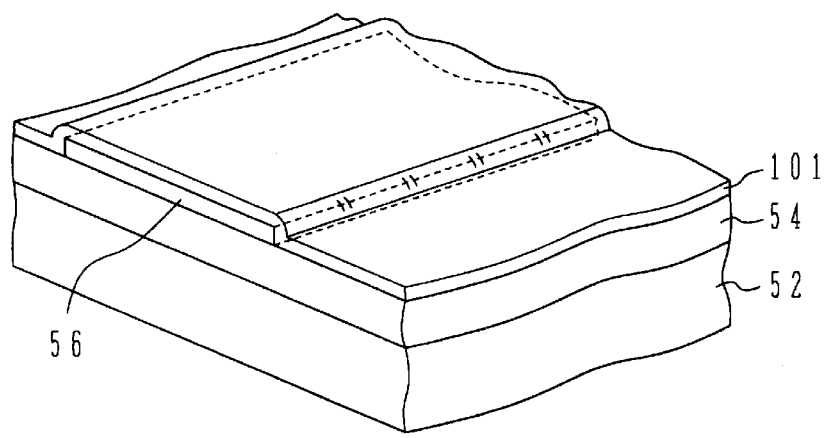

(2) As shown in FIG. 17B, an insulating film 101 of $Al_2O_3$ or the like is deposited through sputtering or the like over the whole surface of the substrate.

Figure 17C:
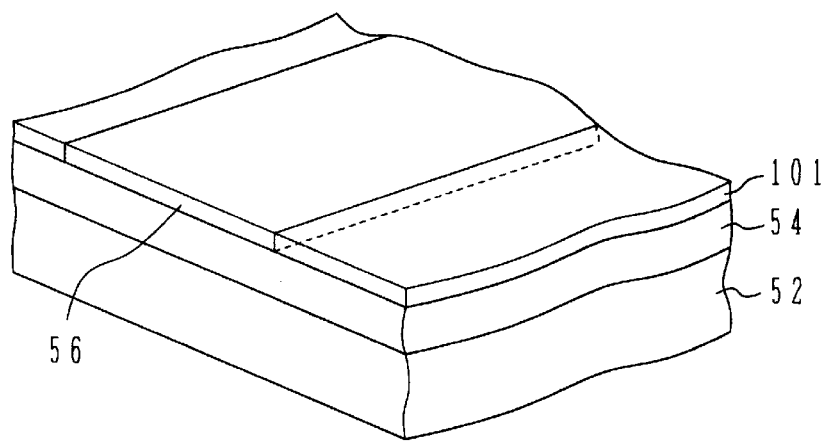

(3) As shown in FIG. 17C, the whole surface of the substrate is abraded to expose the surface of the lower shield layer 56 and thin it to a predetermined thickness. The lower shield layer 56 becomes coplanar to the insulating film 101 so that the lower shield layer 56 is embedded in the insulating film 101 to provide a flat surface.

Figure 17D:
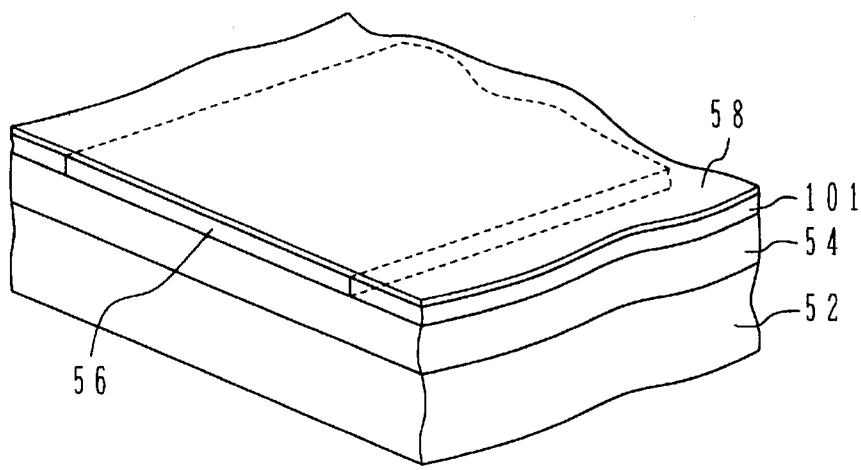

(4) As shown in FIG. 17D, an insulating film of $Al_2O_3$ or the like is deposited through sputtering or the like over the whole flat surface of the substrate to form a lower gap layer 58.

Figure 17E:
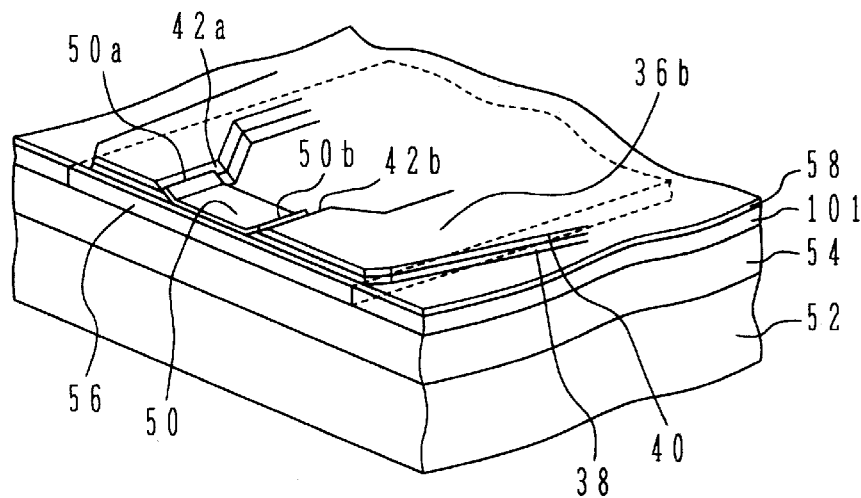

(5) Referring to FIG. 17E, on the lower gap layer 58, a hard magnetic film 38 of CoCrTa, CoCrPt, CoPt or the like and an electrically conductive and non-magnetic film 40 of W, Ta, Nb or the like are laminated through sputtering, vapor deposition, or plating. This lamination is etched (ion milling) to form an inverse-trapezoidal groove and leads 36a and 36b.

Figure 18A:
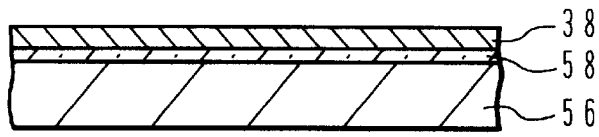
FIGS. 18A to 18H are cross sectional views illustrating the details of the process of FIG. 17E, as viewed from the magnetic recording medium side.
Figure 18B:
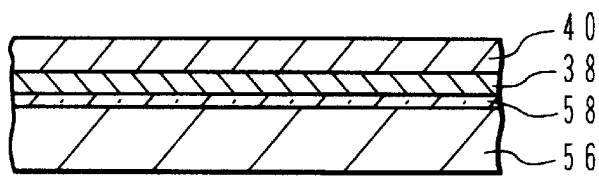
Figure 18C:
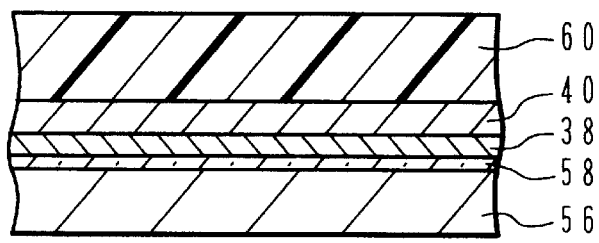
Figure 18D:
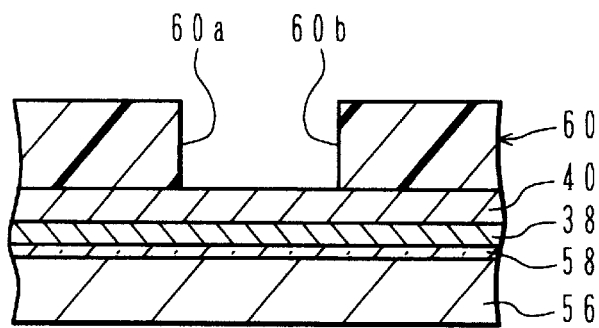

A method of setting the slant angle θ of slanted surfaces 42a and 42b of the leads 36a and 36b to a desired angle will be described with reference to FIGS. 18A to 18H. (I) As shown in FIG. 18A, CoCrPt or the like is deposited through sputtering or the like on the lower gap layer 58 to a thickness of 90 to 200 nm to form a magnetic film 38. (II) As shown in FIG. 18B, hard metal material such as W is deposited through sputtering or the like on the magnetic film 38 to a thickness of 100 to 300 nm to form a conductive metal film 40. (III) As shown in FIG. 18C, on the conductive metal film 40, novolak resist such as AZ4000 is spin coated to a thickness of 1 to 2 μm for the preparation of a later milling process. (IV) As shown in FIG. 18D, the resist is exposed and developed to remove a predetermined area thereof to form side walls 60a and 60b on the resist 60.

Figure 18E:
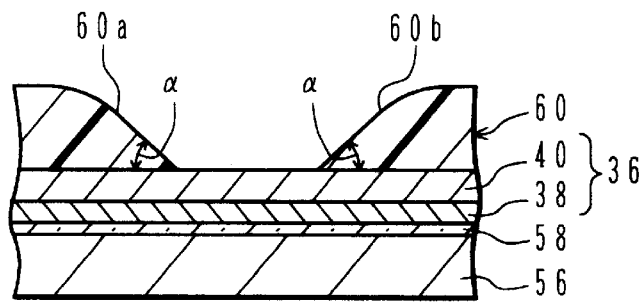
Figure 19:
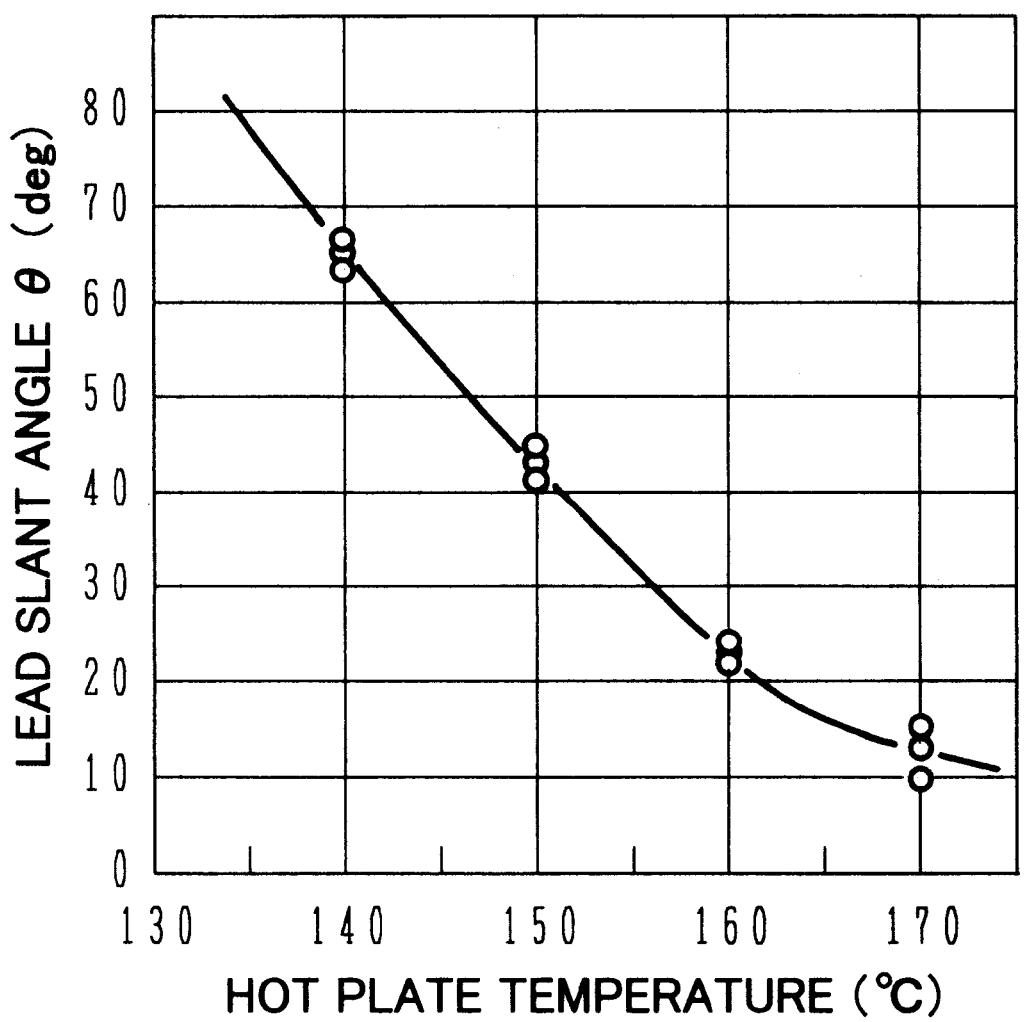
FIG. 19 is a graph showing the relationship between a hot plate temperature and a final lead slant angle when resist is reflowed with a hot plate at the process of FIG. 18E.

(V) As shown in FIG. 18E, this substrate is placed on a hot plate for 15 to 30 minutes to reflow the resist 60 and make the side walls 60a and 60b slanted. The slant angle α of the side walls 60a and 60b at this stage determines the slant angle θ of the final leads 36a and 36b. The slant angle a of the resist side walls 60a and 60b can be controlled by the heating temperature of a hot plate or the like. FIG. 19 shows the relationship between a hot plate temperature used for forming the slanted surfaces of the resist side walls 60a and 60b and the final slant angle θ of the lead slanted surfaces 42a and 42b. The slant angle α of the resist side walls 60a and 60b are determined solely by the hot plate temperature, and if the temperature is controlled in a range of +/−2° C., the slant angle θ of the lead slanted surfaces 42a and 42b can be controlled in a range of +/−2°. For example, in a controlled range of 160 +/−2° C. of the hot plate temperature, the final slant angle θ could be controlled in a range of 21 +/−2°.

Figure 18F:
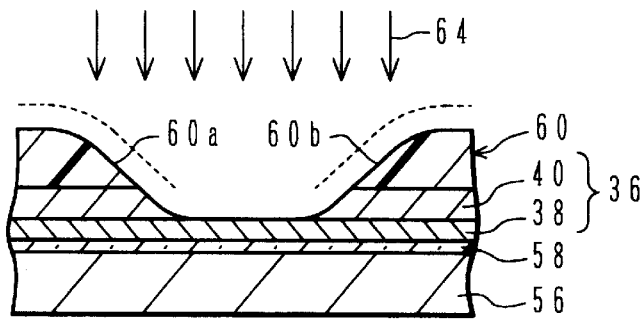
Figure 18G:
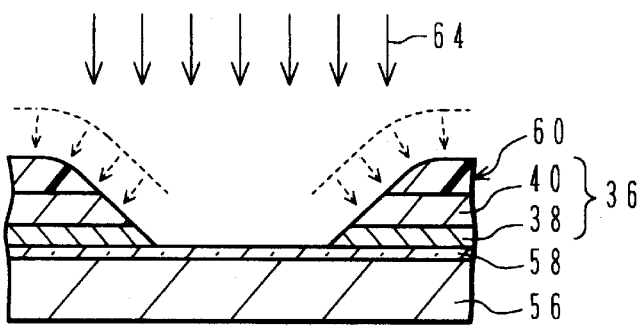
Figure 18H:
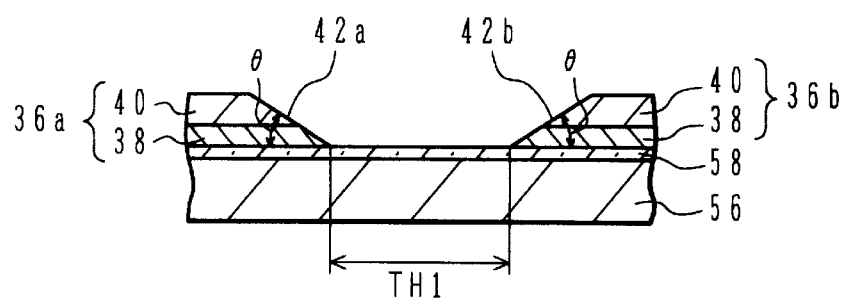

(VI) As shown in FIG. 18F, milling (plasma etching) is executed by radiating ion beams 64 such as argon ion beams to form the leads 36a and 36b having a predetermined slanted surface. Specifically, (a) as shown in FIG. 18F, as the milling starts, while the resist 60 is milled, the lead material 36 exposed in the opening of the resist 60 is also milled. (b) As shown in FIG. 18G, after the lead material 36 exposed in the opening of the resist 60 is completely removed and the lower gap layer 58 is exposed, the etching is stopped. (c) As shown in FIG. 18H, after the resist 60 is removed, the leads 36a and 36b having the slanted surfaces 42a and 42b are completed. The slant angle θ of the slanted surfaces 42a and 42b is approximately given by $$\theta = (R1/Rr)\alpha$$

where α is an initial slant angle of the resist 60, Rr is a milling rate of the resist 60, and R1 is a milling rate of the lead material 36. Therefore, the slant angle θ of the lead slanted surfaces 42a and 42b can be set in a desired range from 10° to 40° by setting a proper initial angle α of the resist in accordance with the milling rates R1 and Rr of the resist and lead materials.

After the leads 36a and 36b are formed in the above manner, a magnetic sensor film 50 is deposited on the substrate whole surface as shown in FIG. 17E. The magnetic sensor film 50 is a lamination of an MR film (NiFe or the like) 44, a spacer (Ti or the like) 46 and an SAL bias film (soft magnetic film of CoZrM (M is Nb, Mo or the like) or the like) 48. On this magnetic sensor film 50, a resist pattern having a desired shape of the magnetic sensor film pattern is formed, and an unnecessary portion of the magnetic sensor film 50 is removed by milling to thereby form a rectangular magnetic sensor film 50. At this stage, the right and left ends 50b and 50a of the magnetic sensor film 50 terminate at intermediate positions of the slanted surfaces 42b and 42a.

Figure 17F:
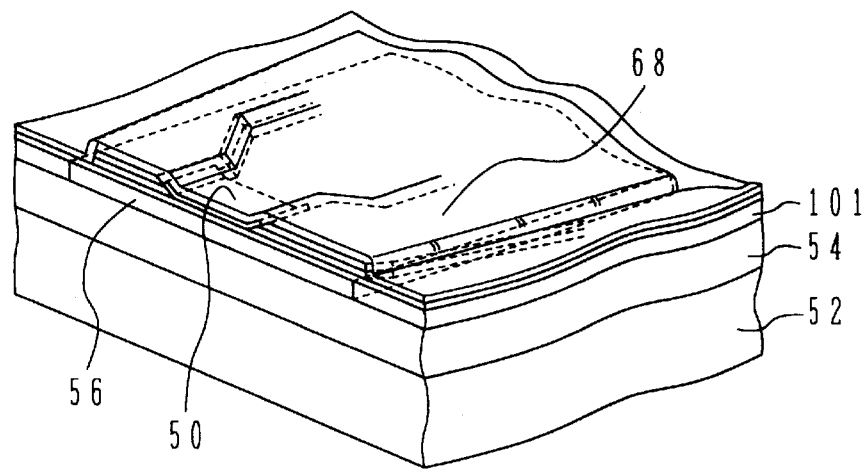

(6) As shown in FIG. 17F, an inorganic insulating film of $Al_2O_3$ or the like is deposited over the whole surface of the wafer to form an upper gap layer 68. The upper gap layer 68 insulates the magnetic sensor film 50 from an upper shield layer and forms a shield gap between the upper shield layer and the leads 36a and 36b.

Figure 17G:
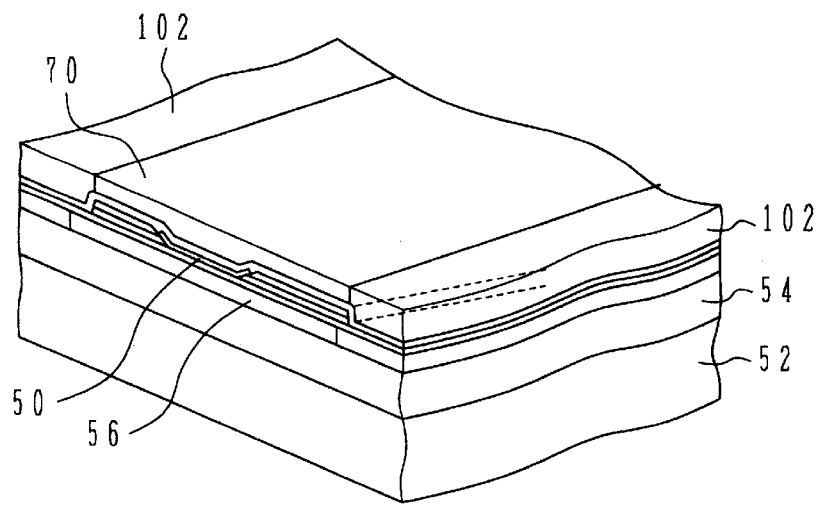

(7) As shown in FIG. 17G, a soft magnetic film (NiFe, FeAlSi or the like) is deposited through plating, vapor deposition, sputtering or the like and etched into a predetermined shape to form an upper shield layer 70. The upper shield layer 70 serves also as a lower core layer of the write head (induction type magnetic head element). An insulating film of $Al_2O_3$ or the like is formed over the substrate whole surface, and abraded to expose and thin the upper shield/lower core layer 70 to a predetermined thickness. The remaining insulating film 102 covers the peripheral area of the upper shield/lower core layer 70.

Figure 17H:
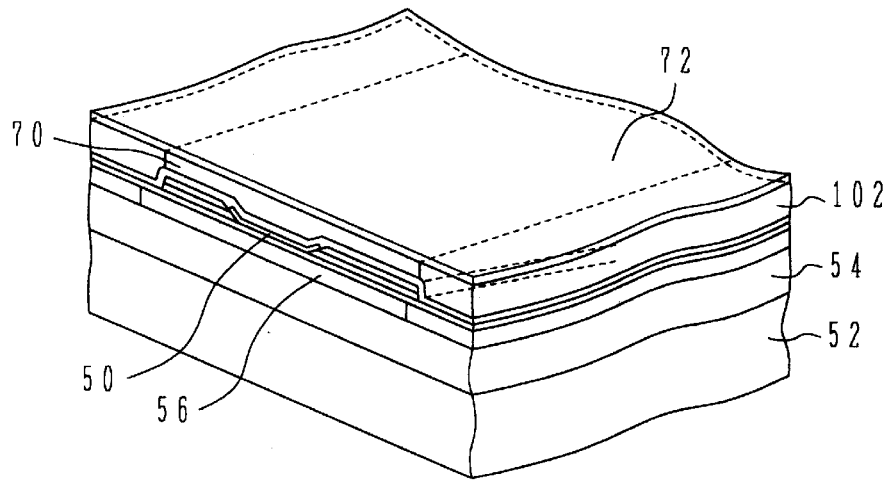

(8) As shown in FIG. 17H, a write gap layer 72 ($Al_2O_3$ or the like) is formed on the upper shield/lower core layer 70.

Figure 17I:
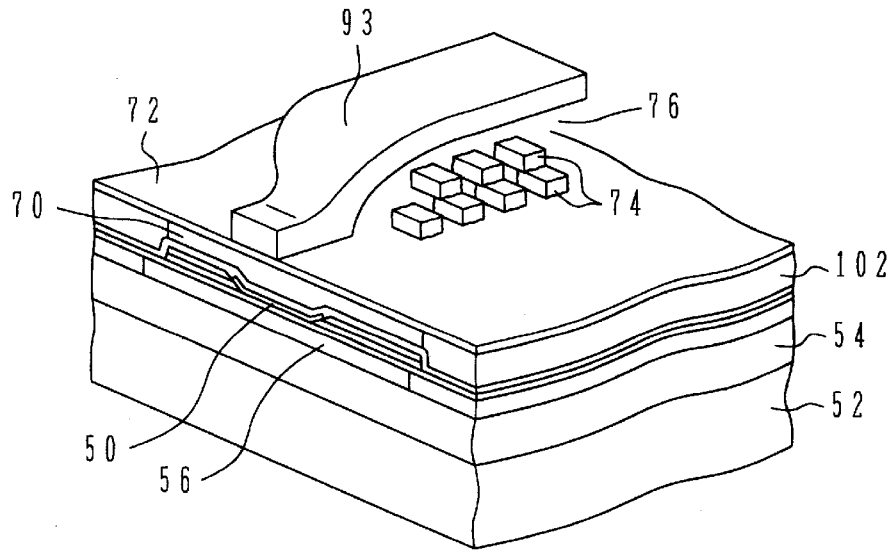

(9) As shown in FIG. 17I, a coil 74 and an insulating layer 76 covering the coil 74 are formed on the write gap layer 72. An upper core layer 93 is formed riding upon the coil 74 and insulating layer 76 to form a write head. Lastly, a passivation film is coated over the wafer.

The present invention has been described in connection with the preferred embodiments. The invention is not limited only to the above embodiments. It is apparent that various modifications, improvements, combinations, and the like can be made by those skilled in the art.

What is claimed is:

1. A magneto-resistance type magnetic head comprising:
   (a) a base;
   (b) a longitudinal bias portion, formed over the base and having a first upper flat surface and a first slanted portion, for generating a longitudinal bias magnetic field;
   (c) a lead portion laminated directly on the longitudinal bias portion so as to cover the first upper flat portion and to expose the first slanted portion of the longitudinal bias portion, wherein the lead portion is made of non-magnetic material and has a second upper flat surface and a second slanted portion, and wherein the first and second slanted portions collectively serve as a slanted surface; and
   (d) a magneto-resistance material layer formed over the longitudinal bias portion and the lead portion, wherein the magneto-resistance material layer directly contacts an upper surface of the base and magnetically couples with the exposed longitudinal bias portion through the slanted surface of the longitudinal bias portion, wherein the magneto-resistance material layer is terminated on the slanted surface.

2. A magneto-resistance type magnetic head according to claim 1, wherein the longitudinal bias portion comprises a material selected from a group consisting of CoCrTa, CoCrPt and CoPt.

3. A magneto-resistance type magnetic head according to claim 1, wherein the lead portion comprises a material selected from a group consisting of W and Ta.

4. A magneto-resistance type magnetic head according to claim 1, wherein the base comprises:
   (a-1) a substrate;
   (a-2) a protective coat;
   (a-3) a lower magnetic shield layer; and
   (a-4) a lower magnetic gap layer.

5. A magneto-resistance type magnetic head according to claim 1, further comprising:
   (e) a first spacer layer formed on the magneto-resistance material layer;
   (f) a transverse bias layer formed on the first spacer layer;
   (g) an upper magnetic shield layer formed on the transverse bias layer; and
   (h) an upper magnetic gap layer formed on the upper magnetic shield layer.

6. A magneto-resistance type magnetic head according to claim 1, wherein the longitudinal bias portion comprises a pair of longitudinal bias films and the lead portion comprises a pair of leads so as to mutually define a space therebetween.

7. A magneto-resistance type magnetic head according to claim 1, wherein the base has a planar surface and the longitudinal bias layer is formed on the planar surface.

8. A magneto-resistance type magnetic head according to claim 1, wherein the slanted surface has an angle in a range of 10 degrees to 40 degrees relative to the horizontal surface of the base.

9. A magneto-resistance type magnetic head according to claim 5, wherein the first layer is made of Ti.

10. A magneto-resistance type magnetic head according to claim 5, wherein the transverse bias layer comprises a soft magnetic material selected from a group consisting of CoZrNb, CoZrMo, NiFeRh and NiFeZr.

11. A magneto-resistance type magnetic head according to claim 6, wherein the slanted surfaces of the first and second leads and the first and second longitudinal bias films define an inverted trapezoidal shape.

* * * * *